US008218031B2

(12) United States Patent
Fujimaki et al.

(10) Patent No.: US 8,218,031 B2
(45) Date of Patent: Jul. 10, 2012

(54) INFORMATION RECORDING APPARATUS, IMAGING APPARATUS, INFORMATION RECORDING METHOD, AND PROGRAM

(75) Inventors: Garen Fujimaki, Tokyo (JP); Hiroshi Kakuda, Tokyo (JP); Takao Morita, Chiba (JP); Takashi Sakuma, Kanagawa (JP); Kayo Ishii, Tokyo (JP); Yuka Endo, Tokyo (JP)

(73) Assignee: Sony Corporation (JP)

( * ) Notice: Subject to any disclaimer, the term of this patent is extended or adjusted under 35 U.S.C. 154(b) by 379 days.

(21) Appl. No.: 12/583,054

(22) Filed: Aug. 13, 2009

(65) Prior Publication Data

US 2010/0039529 A1 Feb. 18, 2010

(30) Foreign Application Priority Data

Aug. 18, 2008 (JP) ................................ P2008-209499

(51) Int. Cl.
*H04N 5/76* (2006.01)
(52) U.S. Cl. .................. 348/231.3; 348/231.99; 705/1.1
(58) Field of Classification Search ............... 348/231.3, 348/231.99
See application file for complete search history.

(56) References Cited

U.S. PATENT DOCUMENTS

| 2002/0023010 | A1* | 2/2002 | Rittmaster et al. | 705/26 |
| 2003/0004916 | A1* | 1/2003 | Lewis | 707/1 |
| 2007/0282621 | A1* | 12/2007 | Altman et al. | 705/1 |
| 2008/0118100 | A1* | 5/2008 | Hayashi | 382/100 |
| 2008/0291315 | A1* | 11/2008 | Yoon | 348/333.01 |
| 2009/0322904 | A1* | 12/2009 | Takahashi | 348/231.3 |

FOREIGN PATENT DOCUMENTS

| JP | 2000-261704 A | 9/2000 |
| JP | 2007-088754 A | 4/2007 |

* cited by examiner

*Primary Examiner* — Jason Chan
*Assistant Examiner* — Cynthia Segura
(74) *Attorney, Agent, or Firm* — Lerner, David, Littenberg, Krumholz & Mentlik, LLP

(57) ABSTRACT

An imaging apparatus includes: a captured image data generation unit generating captured image data by capturing a subject; a positional information acquisition unit acquiring positional information indicating a position at which the captured image data are generated; an area determination unit determining whether the position indicated by the acquired positional information is included in a positional information conversion area for converting the acquired positional information; a positional information conversion unit, when the area determination unit determines that the position indicated by the acquired positional information is included in the positional information conversion area, converting the acquired positional information into positional information indicating a position different from the position indicated by the acquired positional information; and a record control unit, when recording the generated captured image data, carrying out control to record the generated captured image data in association with the positional information converted by the positional information conversion unit.

15 Claims, 22 Drawing Sheets

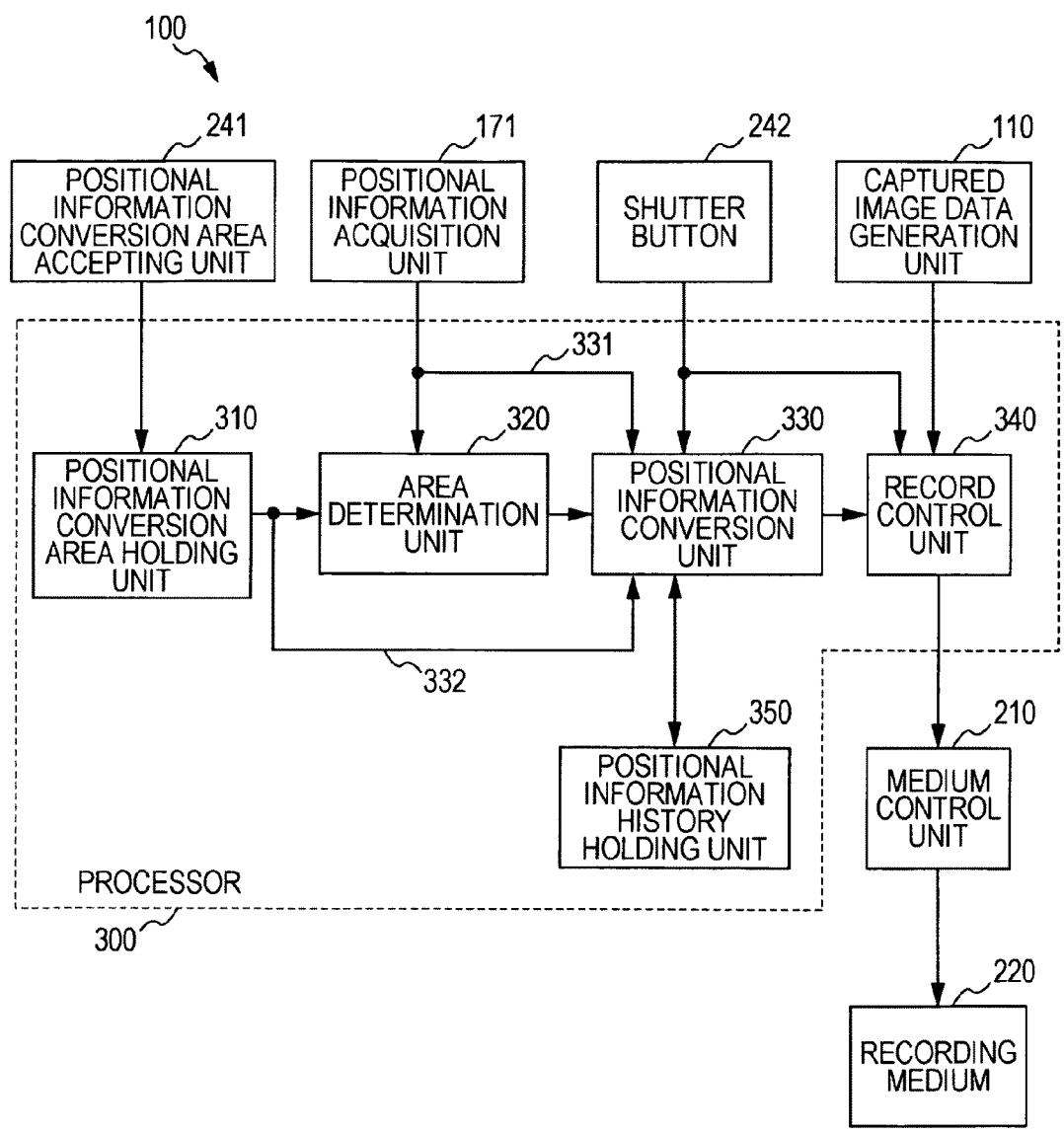

FIG. 6

GPS INFORMATION

| | | |
|---|---|---|
| GPS TAG VERSION (GPSVersionID) | VERSION 2.0 | 551 |
| NORTH LATITUDE / SOUTH LATITUDE (GPSLatitudeRef) | NORTH LATITUDE (N) | 552 |
| LATITUDE (GPSLatitude) | 35 DEGREES, 37 MINUTES, 42 SECONDS (0x23, 0x25, 0x2A) | 553 |
| EAST LONGITUDE / WEST LONGITUDE (GPSLongitudeRef) | EAST LONGITUDE (E) | 554 |
| LONGITUDE (GPSLongitude) | 139 DEGREES, 44 MINUTES, 25 SECONDS (0x8B, 0x2C, 0x19) | 555 |
| ⋮ | ⋮ | |

FIG. 12

| ARI_PCK | 768 |
|---|---|

| ADDITIONAL RECORDING INFORMATION IDENTIFIER | |
|---|---|
| ARI_DAT_ID | ADDITIONAL RECORDING INFORMATION DATA IDENTIFIER |
| ARI_DAT_VER | ADDITIONAL RECORDING INFORMATION VERSION |
| APPLICATION INFORMATION | |
| VND_NAME | VENDER NAME |
| PRD_NAME | PRODUCT NAME |
| APL_ID | APPLICATION IDENTIFIER |
| MNFI_DATA | MANUFACTURER INFORMATION DATA |
| PRD_TYP | DEVICE TYPE |
| RECORDING TIME INFORMATION | |
| VOB_LCL_TM_ZONE | TIME ZONE WHEN RECORDING ARI_DATA |
| VOB_REC_TM | ARI_DATA RECORDING TIME |
| CAMERA INFORMATION | |
| F_NUM | F NUMBER |
| EXP_TM | EXPOSURE TIME |
| ⋮ | ⋮ |
| POSITIONAL INFORMATION | |
| GPS_LAT_REF | NORTH LATITUDE (N) / SOUTH LATITUDE (S) |
| GPS_LAT | LATITUDE |
| GPS_LON_REF | EAST LONGITUDE (E) / WEST LONGITUDE (W) |
| GPS_LON | LONGITUDE |

FIG. 17

| ENCRYPTED POSITIONAL INFORMATION | POSITIONAL INFORMATION (BEFORE CONVERSION) | |
|---|---|---|
| | LONGITUDE | LATITUDE |
| 1 | 139.551430 | 35.650600 |
| 2 | 139.739100 | 35.628350 |
| ⋮ | ⋮ | ⋮ |

INFORMATION RECORDING APPARATUS, IMAGING APPARATUS, INFORMATION RECORDING METHOD, AND PROGRAM

CROSS-REFERENCE TO RELATED APPLICATION

The present application claims priority from Japanese Patent Application No. JP 2008-209499 filed in the Japanese Patent Office on Aug. 18, 2008, the entire content of which is incorporated herein by reference.

BACKGROUND OF THE INVENTION

1. Field of the Invention

The invention relates to an information recording apparatus and, more particularly, to an information recording apparatus and imaging apparatus that record captured image data in association with positional information, a positional information conversion method in these apparatuses, and a program that causes a computer to execute the method.

2. Description of the Related Art

In an existing art, there is an imaging apparatus, such as a digital still camera, as an information recording apparatus that records a content. The imaging apparatus, for example, captures a subject, such as a person, and then records the captured image. In addition, the captured image recorded by the imaging apparatus is widely exchanged with others, other than a photographer, using a network, such as the Internet, or a recording medium. Furthermore, the captured image recoded by the imaging apparatus is widely opened to the public using a web site in the Internet, or the like.

In addition, in recent years, there is suggested a digital still camera that acquires positional information using a GPS (Global Positioning System) and that records a captured image added with the positional information (for example, see Japanese Unexamined Patent Application Publication No. 2000-261704, FIG. 1). In this way, by adding the positional information to the captured image, a user who acquires the captured image can see a location at which the image is captured.

For example, when the above existing technique is used to take a picture of user's home, personal information, such as user's home address, may be added to the captured image as positional information. The personal information, such as a home address, is presumably the information that a user does not want a person, other than user's acquaintance, to see. However, when a captured image added with personal information as positional information is opened to the public using a web site, or the like, a third person can see the positional information added to the captured image.

Then, there is suggested a content data processing apparatus that, when an image file added with personal information that a user does not want others to see is transmitted to an external device, deletes the personal information through user's operation and then transmits the image file (for example, see Japanese Unexamined Patent Application Publication No. 2007-88754, FIG. 1).

SUMMARY OF THE INVENTION

According to the above described existing art, for example, when a captured image added with positional information that a user does not want others to see is opened to the public using a web site, or the like, the captured image may be opened to the public after deleting the positional information through user's operation. By so doing, it is possible to prevent others from seeing the positional information added to the captured image. However, for example, when positional information is deleted only from a portion of captured images among a plurality of captured images, there is a possibility that the deleted positional information may be inferred by a third person from analogy by being compared with positional information added to the other captured images.

It is desirable to prevent others from seeing positional information related to personal information when a captured image is used.

According to a first embodiment of the invention, an imaging apparatus includes: a captured image data generation unit that generates captured image data by capturing a subject; a positional information acquisition unit that acquires positional information that indicates a position at which the captured image data are generated; an area determination unit that determines whether the position indicated by the acquired positional information is included in a positional information conversion area for converting the acquired positional information; a positional information conversion unit that, when the area determination unit determines that the position indicated by the acquired positional information is included in the positional information conversion area, converts the acquired positional information into positional information that indicates a position different from the position indicated by the acquired positional information; and a record control unit that, when recording the generated captured image data, carries out control so as to record the generated captured image data in association with the positional information converted by the positional information conversion unit, a processing method therefor, and a program for causing a computer to execute the method. With the above configuration, when the position indicated by the acquired positional information is included in the positional information conversion area, the positional information is converted into positional information that indicates a position different from the position indicated by the acquired positional information.

In addition, in the first embodiment, the positional information conversion unit may convert the acquired positional information into the positional information that indicates the different position using a displacement used to move the position indicated by the acquired positional information. With the above configuration, the positional information is converted into positional information that indicates a position different from the position indicated by the acquired positional information using a displacement used to move the position indicated by the positional information acquired by the positional information acquisition unit.

In addition, in the first embodiment, the positional information conversion unit may generate the positional information that indicates the different position in the positional information conversion area on the basis of a random number. With the above configuration, the positional information that indicates the different position in the positional information conversion area is generated on the basis of a random number.

In addition, in the first embodiment, the imaging apparatus may further include a positional information history holding unit that holds a history of the acquired positional information, wherein the positional information conversion unit may generate the positional information that indicates the different position in a history area defined by the history of the positional information held by the positional information history holding unit on the basis of a random number. With the above configuration, the positional information that indicates the different position in the history area defined by the history of the acquired positional information is generated on the basis of a random number.

In addition, in the first embodiment, the imaging apparatus may further include a positional information history holding unit that holds a history of the acquired positional information, wherein the positional information conversion unit may generate the positional information that indicates the different position in an extended area that includes a history area, defined by the history of the positional information held by the positional information history holding unit, and the positional information conversion area on the basis of a random number. With the above configuration, the extended area includes the history area defined by the history of the positional information held by the positional information history holding unit and the positional information conversion area, and the positional information that indicates the different position in the extended area is generated on the basis of a random number.

In addition, in the first embodiment, the imaging apparatus may further include an encryption processing unit that carries out encryption process on the acquired positional information, wherein the record control unit, when the area determination unit determines that the position indicated by the acquired positional information is included in the positional information conversion area, may carry out control so that the generated captured image data are recorded so as to be associated with the positional information converted by the positional information conversion unit and the positional information encrypted by the encryption processing unit. With the above configuration, when the area determination unit determines that the position indicated by the acquired positional information is included in the positional information conversion area, the captured image data are recorded so as to be associated with the positional information converted by the positional information conversion unit and the positional information encrypted by the encryption processing unit In this case, the encryption processing unit may generate a correspondence table that associates the encrypted positional information with the acquired positional information. With the above configuration, the correspondence table that associates the encrypted positional information with the acquired positional information is generated.

In addition, the imaging apparatus may further include an encryption processing unit that carries out encryption process on the acquired positional information, wherein, when the area determination unit determines that the position indicated by the acquired positional information is included in the positional information conversion area, the record control unit may carry out control so that the generated captured image data are recorded so as to be associated with the positional information converted by the positional information conversion unit and the positional information encrypted by the encryption processing unit. In this case, the imaging apparatus may further include a password accepting unit that accepts a password, wherein the encryption processing unit may generate the encrypted positional information using a cryptographic key generated on the basis of the password accepted by the password accepting unit. With the above configuration, the encrypted positional information is generated using the cryptographic key generated on the basis of the password.

According to a second embodiment of the invention, an information recording apparatus includes: a file read control unit that carries out control so as to read out a captured image file, which associates captured image data generated by capturing a subject with positional information that indicates a position at which the captured image data are generated, from a recording medium; a positional information extracting unit that extracts positional information in the captured image file read by the file read control unit; an area determination unit that determines whether a position indicated by the extracted positional information is included in a positional information conversion area for converting the extracted positional information; a positional information conversion unit that, when the area determination unit determines that the position indicated by the extracted positional information is included in the positional information conversion area, converts the extracted positional information into positional information that indicates a position different from the position indicated by the extracted positional information; and a record control unit that carries out control so as to record the read captured image file so that the captured image data in the read captured image file are associated with the positional information converted by the positional information conversion unit, a processing method therefor, and a program for causing a computer to execute the method.

In addition, in the second embodiment, the information recording apparatus may further include a transmission control unit that carries out control so as to transmit the captured image data, associated by the record control unit with the positional information converted by the positional information conversion unit, and the converted positional information. With the above configuration, the captured image data, associated by the record control unit with the positional information converted by the positional information conversion unit, and the converted positional information are transmitted.

BRIEF DESCRIPTION OF THE DRAWINGS

FIG. 2 is a block diagram that shows a functional configuration when a first example embodiment of an imaging apparatus captures an image according to the embodiment of the invention;

FIG. 6 is a view that shows the structure of GPS information 550 in the static image file 500 of the first example embodiment of the imaging apparatus 100 according to the embodiment of the invention;

FIG. 12 is a view that shows the data structure of additional recording information (ARI_PCK) according to the embodiment of the invention;

FIG. 17 is a view that shows an example of a correspondence table related to positional information generated by an encryption processing unit 360 in the second example embodiment of the imaging apparatus 100 according to the embodiment of the invention;

DESCRIPTION OF THE PREFERRED EMBODIMENTS

Next, an embodiment of the invention will be described in detail with reference to the accompanying drawings.

Figure 1:
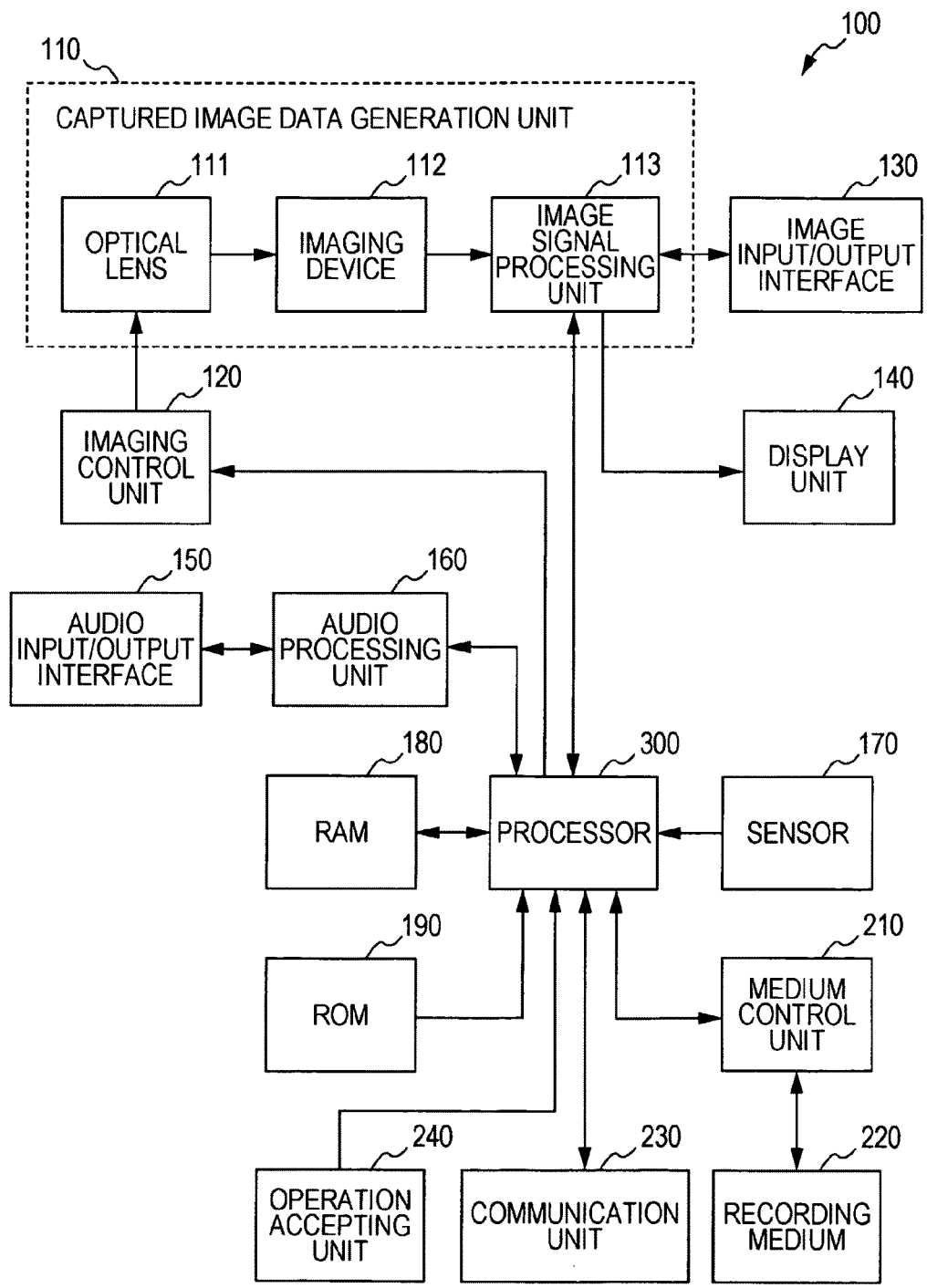
FIG. 1 is a block diagram that shows one configuration example of an imaging apparatus according to an embodiment of the invention.

FIG. 1 is a block diagram that shows one configuration example of an imaging apparatus according to the embodiment of the invention. The imaging apparatus 100 includes a captured image data generation unit 110, an imaging control unit 120, an image input/output interface 130, a display unit 140, an audio input/output interface 150, an audio processing unit 160 and a sensor 170. In addition, the imaging apparatus 100 includes a RAM (Random Access Memory) 180, a ROM (Read Only Memory) 190, a medium control unit 210, a recording medium 220, a communication unit 230, an operation accepting unit 240, and a processor 300.

The captured image data generation unit 110 captures an image of a subject to generate captured image data. The captured image data correspond to static image data or moving image data. Note that the captured image data generation unit 110 may be regarded as a captured image data generation unit according to the embodiment of the invention.

The captured image data generation unit 110 includes an optical lens 111, an imaging device 112 and an image signal processing unit 113. The optical lens 111 is formed of a plurality of lenses that collect light from the subject. The optical lens 111 outputs the light incident from the subject to the imaging device 112 via these lenses and an iris.

The imaging device 112 photoelectrically converts an optical signal incident from the subject via the optical lens 111 into an analog image signal on the basis of control executed by the processor 300. The imaging device 112 supplies the photoelectrically converted analog image signal to the image signal processing unit 113. The imaging device 112 may be implemented by, for example, a CCD (Charge Coupled Device) sensor, a CMOS (Complementary Metal Oxide Semiconductor) sensor, or the like.

The image signal processing unit 113 carries out predetermined signal processing on the analog image signal supplied from the imaging device 112 on the basis of control executed by the processor 300. That is, the image signal processing unit 113 carries out analog signal processing, such as noise reduction, on the analog image signal supplied from the imaging device 112, and then A/D (Analog/Digital) converts the image signal on which the analog signal processing has been carried out. Then, the image signal processing unit 113 carries out digital signal processing, such as edge enhancement, gamma correction and flicker reduction, on the digital signal obtained through the A/D conversion to generate captured image data. In addition, the image signal processing unit 113 supplies the generated captured image data to the display unit 140 and the image input/output interface 130.

The imaging control unit 120 controls the optical lens 111 on the basis of control executed by the processor 300.

The image input/output interface 130 exchanges captured image data between the imaging apparatus 100 and an external device. The image input/output interface 130 supplies captured image data from the external device to the image signal processing unit 113. In addition, the image input/output interface 130 outputs captured image data generated by the image signal processing unit 113 to the external device.

The display unit 140 displays the captured image data generated by the image signal processing unit 113 as an image. The display unit 140 may be, for example, implemented by an LCD (Liquid Crystal Display).

The audio input/output interface 150 exchanges an audio signal between the imaging apparatus 100 and the external device. The audio input/output interface 150 supplies an audio signal from the external device to the audio processing unit 160. In addition, the audio input/output interface 150 outputs an audio signal from the audio processing unit 160 to the external device.

The audio processing unit 160 converts an audio signal from the external device into a predetermined digital signal. The audio processing unit 160 supplies the converted digital signal to the processor 300.

The sensor 170 is formed of a plurality of sensors. The sensor 170, for example, includes a sensor that acquires positional information.

The RAM 180 is a memory used as a main memory of the processor 300. The RAM 180 has a work area, or the like, for a program executed by the processor 300. The ROM 190 is a read only memory, and stores various control programs, or the like.

The medium control unit 210 records captured image data generated by the captured image data generation unit 110, positional information, and the like, in the recording medium 220 on the basis of control executed by the processor 300. In addition, the medium control unit 210 reads out data recorded in the recording medium 220.

The recording medium 220 stores captured image data, positional information, and the like. Here, various types of data, such as a JPEG (Joint Photographic Experts Group) format image file, are recorded in the recording medium 220. In addition, the recording medium 220 may be, for example, implemented by a memory card, an optical disk, a magnetic disk, a magnetic tape, or the like. Note that the recording medium 220 may be detachable from the imaging apparatus 100.

The communication unit 230 carries out communication between the imaging apparatus 100 and the external device. The communication unit 230 carries out wired communication, for example, through a wire cable, such as a LAN (Local Area Network) cable and a USB (Universal Serial Bus) cable. In addition, the communication unit 230, for example, carries out wireless communication, such as IEEE802.11a/b/g or Bluetooth (trademark).

The operation accepting unit 240 accepts operations of various settings, or the like, by an imaging person who uses the imaging apparatus 100. The operation accepting unit 240 supplies the processor 300 with signals corresponding to these operations. For example, a shutter button for starting recording operation of a captured image is provided as the operation accepting unit 240 for the imaging apparatus 100.

The processor 300 controls the image signal processing unit 113, the imaging control unit 120, the audio processing unit 160, the medium control unit 210 and the communication unit 230 on the basis of the various control programs stored in the ROM 190. In addition, the processor 300 controls the image signal processing unit 113, the imaging control unit 120, the audio processing unit 160, the medium control unit 210 and the communication unit 230 on the basis of input operation, or the like, accepted by the operation accepting unit 240.

FIG. 2 is a block diagram that shows a functional configuration when a first example embodiment of the imaging apparatus 100 captures an image according to the embodiment of the invention. Here, FIG. 2 shows the captured image data generation unit 110, a positional information acquisition unit 171, the medium control unit 210, the recording medium 220, a positional information conversion area accepting unit 241, a shutter button 242 and the processor 300. The processor 300 includes a positional information conversion area holding unit 310, an area determination unit 320, a positional information conversion unit 330, a record control unit 340, and a positional information history holding unit 350. Note that the captured image data generation unit 110, the medium control unit 210 and the recording medium 220 are similar to those of FIG. 1, so the description thereof is omitted here.

The positional information acquisition unit 171 acquires positional information that indicates the position of the imaging apparatus 100 when captured image data are generated. The positional information acquisition unit 171, for example, calculates positional information on the basis of a GPS signal received by a GPS signal receiving antenna. Then, the positional information acquisition unit 171 supplies the calculated positional information to the processor 300. Note that the calculated positional information includes information related to a position, such as a latitude and a longitude. In addition, the positional information acquisition unit 171 corresponds to the sensor 170 shown in FIG. 1. In addition, the positional information acquisition unit 171 may be regarded as a positional information acquisition unit according to the embodiment of the invention.

The positional information conversion area accepting unit 241 accepts a positional information conversion area set by the imaging person. The positional information conversion area is, for example, an area related to the privacy of a person or personal information and is an area that includes a position that the imaging person does not want a third person to see. The positional information conversion area, for example, includes areas that include a home, an office, a commuting path, a school of children, such as a nursery, a kindergarten, an elementary school, a junior high school, a senior high school and a university, a partner's home, parents' home, or the like.

The positional information conversion area holding unit 310 holds a positional information conversion area accepted by the positional information conversion area accepting unit 241. The positional information conversion area holding unit 310 supplies the held positional information conversion area to the area determination unit 320.

The area determination unit 320 determines whether the position indicated by the positional information acquired by the positional information acquisition unit 171 is included in the positional information conversion area held by the positional information conversion area holding unit 310. The area determination unit 320 supplies the determined result to the positional information conversion unit 330. Note that the area determination unit 320 may be regarded as an area determination unit according to the embodiment of the invention.

The positional information conversion unit 330 converts positional information acquired by the positional information acquisition unit 171 into positional information that indicates a position different from a position indicated by the positional information. When the area determination unit 320 determines that a position is included in the positional information conversion area, the positional information conversion unit 330 supplies the converted positional information to the record control unit 340. On the other hand, when the area determination unit 320 determines that a position is not included in the positional information conversion area, the positional information conversion unit 330 directly supplies the positional information, acquired by the positional information acquisition unit 171, to the record control unit 340 without conversion.

The positional information conversion unit 330, for example, converts the positional information using a displacement used to move a position indicated by positional information from a signal line 331. In this case, the positional information conversion unit 330 converts positional information, acquired by the positional information acquisition unit 171, by adding or subtracting a predetermined value to or from at least one of the latitude and longitude of the positional information.

Note that in this example, it is assumed that the positional information converted by the positional information conversion unit 330 may indicate an unnatural position, such as a position on the sea, depending on the magnitude of a predetermined value used for conversion or a captured position. Therefore, positional information may be converted so as to limit a position indicated by converted positional information within a predetermined area. In this case, the positional information conversion unit 330, for example, converts positional information within a positional information conversion area supplied through a signal line 332. Thus, the positional information conversion unit 330 generates random numbers corresponding respectively to a latitude and a longitude, and generates positional information that indicates a position in the positional information conversion area on the basis of these random numbers. By so doing, it is possible to prevent converted positional information from indicating an unnatural position. Furthermore, when the positional information acquired by the positional information acquisition unit 171 and the converted positional information indicate the same position, random numbers may be generated again to generate positional information.

Note that this example describes an example in which a positional information conversion area is used as a certain area to which a position indicated by converted positional information is limited; instead, positional information may be converted using a positional information history area defined on the basis of a history of positional information at the time when an image is captured in the past. In this case, the positional information conversion unit 330 defines a positional information history area on the basis of a history of positional information held by the positional information history holding unit 350, and converts the positional information within the defined positional information history area. Note that the positional information conversion unit 330 supplies positional information from the positional information acquisition unit 171 to the positional information history holding unit 350 when the shutter button 242 is pressed.

The positional information conversion unit 330, for example, extracts a maximum value and minimum value of latitudes and a maximum value and minimum value of longitudes from among pieces of positional information held by the positional information history holding unit 350, and uses these values to define a rectangular area as a positional information history area. Then, the positional information conversion unit 330 generates random numbers corresponding to a latitude and a longitude and then generates positional information that indicates a position within the positional information history area on the basis of these random numbers. By so doing, the converted positional information indicates a position within the positional information history area. Thus, even when compared with positional information in another captured image, it is possible to make it hard for a third person to infer conversion of positional information from analogy.

Note that, as described above, a positional information conversion area or a positional information history area is used as a certain area to which a position that indicates converted positional information is limited; instead, it is also applicable that a rectangular area that covers both of these areas is defined as an extended area and then the extended area is used. By so doing, it is possible to extend an area of a position that indicates converted positional information to an extent such that the positional information does not indicate an unnatural position. In addition, the positional information conversion unit 330 may be regarded as a positional information conversion unit according to the embodiment of the invention.

As the shutter button 242 is pressed, the record control unit 340 controls the medium control unit so as to generate an image file and then record the image file in the recording medium 220. The record control unit 340 generates an image file by associating captured image data supplied from the captured image data generation unit 110 with positional information supplied from the positional information conversion unit 330. Note that the image file corresponds to a static image file or a moving image file. In addition, the record control unit 340 may be regarded as a record control unit according to the embodiment of the invention.

The positional information history holding unit 350 holds positional information acquired by the positional information acquisition unit 171. That is, the positional information history holding unit 350 holds positional information at the time when an image is captured in the past as a history. Note that the positional information history holding unit 350 is used when a positional information history area is defined. In addition, the positional information history holding unit 350 may be regarded as a positional information history holding unit according to the embodiment of the invention.

The shutter button 242 accepts an image capturing timing from an imaging person. The shutter button 242 outputs an instruction signal for recording captured image data to the positional information conversion unit 330 and the record control unit 340. That is, when the shutter button 242 is pressed, an image file that associates captured image data generated by the captured image data generation unit 110 at the time of pressing the shutter button 242 with positional information supplied from the positional information conversion unit 330 is recorded in the recording medium 220. Note that the shutter button 242 corresponds to the operation accepting unit 240 shown in FIG. 1.

Figure 3A:
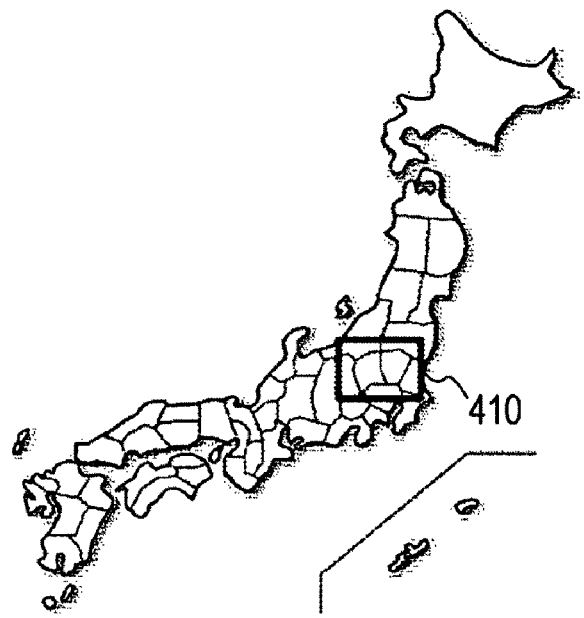
FIG. 3A and FIG. 3B are schematic views related to an example of settings of a positional information conversion area in the imaging apparatus 100 according to the embodiment of the invention.
Figure 3B:
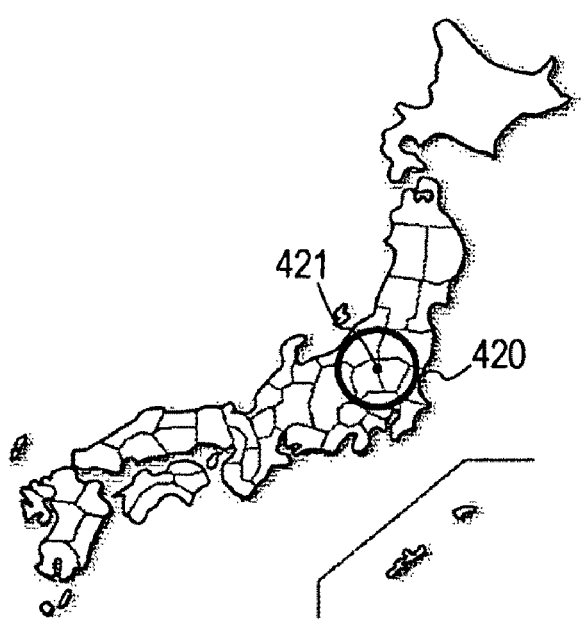

FIG. 3A and FIG. 3B are schematic views related to an example of settings of a positional information conversion area in the imaging apparatus 100 according to the embodiment of the invention. FIG. 3A and FIG. 3B show examples of setting a positional information conversion area on a map of Japan displayed on the display unit 140.

FIG. 3A shows a positional information conversion area 410 set in a rectangular shape as an example. FIG. 3B shows a positional information conversion area 420 set in a circular shape with a radius of R about a center point 421 as an example. In addition, as a setting method other than FIG. 3A and FIG. 3B, it is also applicable that, for example, a positional information conversion area may be set by region, such as by country, by prefecture or by municipal government.

Note that map information displayed on the display unit 140 may be, for example, held by the RAM 180 and may be acquired from the RAM 180 in response to specifying operation from an imaging person. In addition, it is also applicable that map information is recorded in a map information recording device other than the imaging apparatus 100, and the map information is acquired from the map information recording device through a network, such as the Internet. In addition, when a positional information conversion area is set, it is also applicable that a positional information allocation prohibited area is set in another device (personal computer, or the like) other than the imaging apparatus 100, and the set content is transferred to the imaging apparatus 100 and held by the positional information conversion area holding unit.

Figure 4:
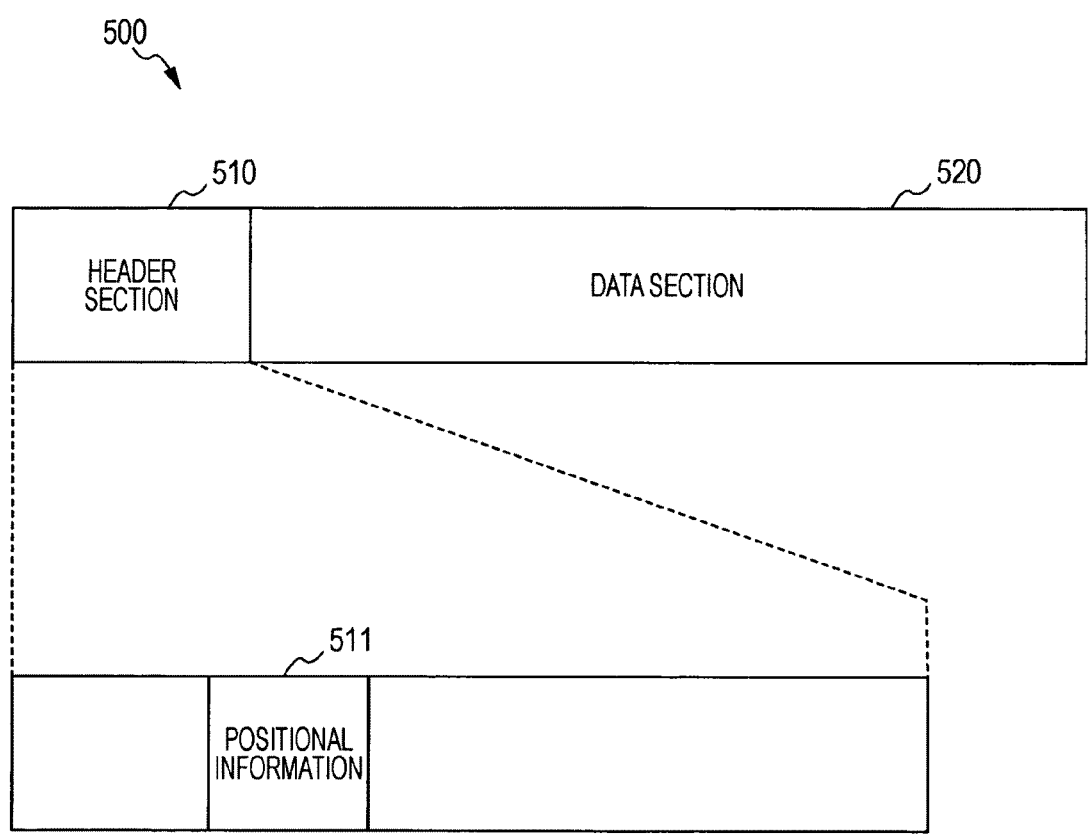
FIG. 4 is a schematic view that shows the file structure of a static image file 500 generated by a record control unit 340 in the first example embodiment of the imaging apparatus 100 according to the embodiment of the invention.

FIG. 4 is a schematic view that shows the file structure of a static image file 500 generated by a record control unit 340 in the first example embodiment of the imaging apparatus 100 according to the embodiment of the invention. The static image file 500 is formed of a header section 510 and a data section 520.

The data section 520 holds static image data, which are captured image data, generated by the captured image data generation unit 110. In addition, the header section 510 holds information related to the static image data, and includes an area of positional information 511 that holds positional information at the time of capturing. The positional information 511 holds positional information supplied from the positional information conversion unit 330. That is, when the area determination unit 320 determines that positional information from the positional information acquisition unit 171 is included in the positional information conversion area, the positional information 511 holds positional information converted by the positional information conversion unit 330. On the other hand, when it is determined that positional information is not included in the positional information conversion area, the positional information 511 continuously holds positional information from the positional information acquisition unit 171. Note that the area of the positional information 511 assumes an area typically used for holding positional information.

Figure 5:
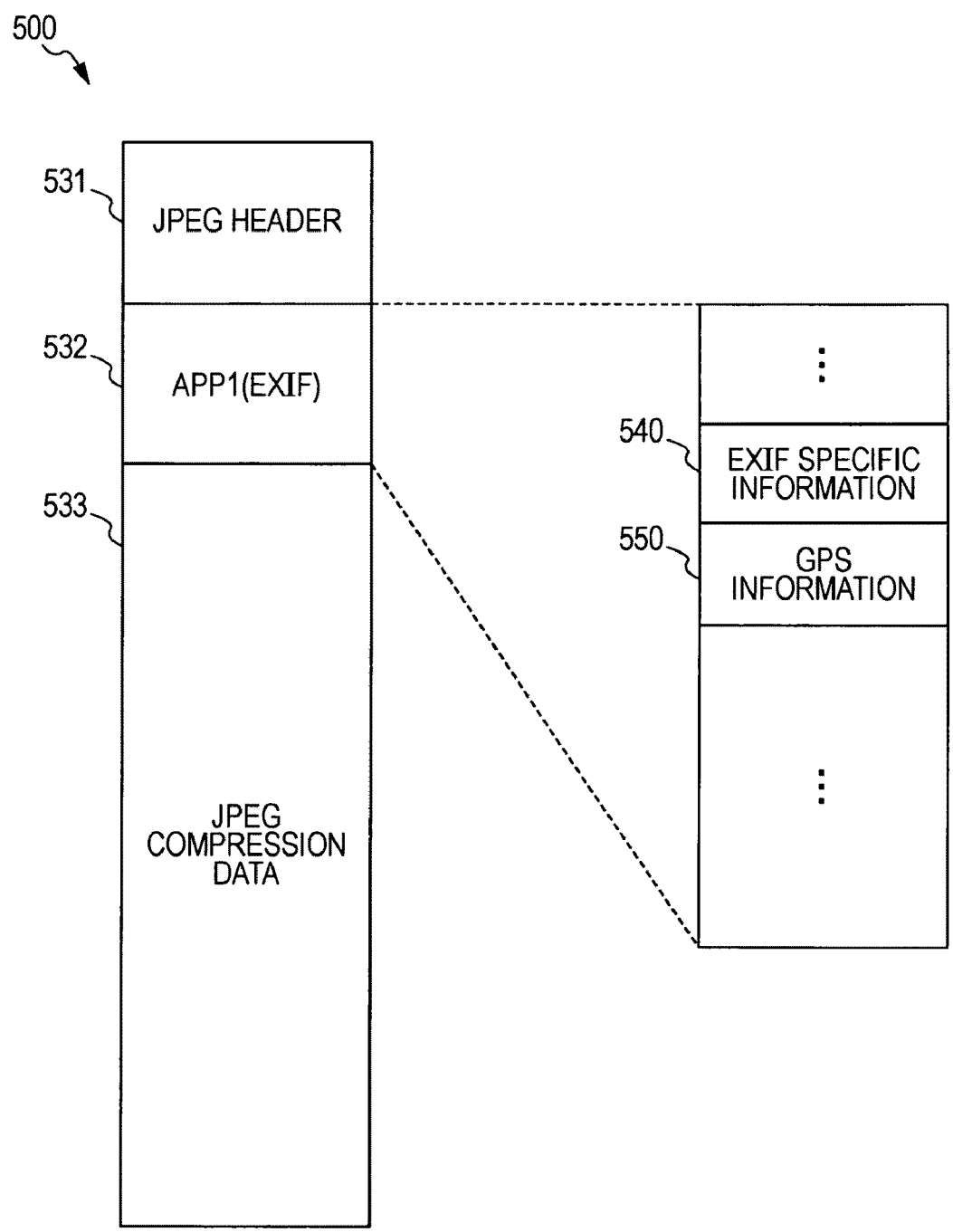
FIG. 5 is a view that shows an example of the file structure of the static image file 500 in the first example embodiment of the imaging apparatus 100 according to the embodiment of the invention.

FIG. 5 is a view that shows an example of the file structure of the static image file 500 in the first example embodiment of the imaging apparatus 100 according to the embodiment of the invention.

The static image file 500 holds JPEG compression data 533 that are compressed in JPEG format. Here, JPEG (Joint Photographic coding Expert Group) is one of compression technologies for image data. Note that a JPEG header 531 is added to the head of the static image file 500 as a header area.

The static image file 600 includes an area called APP1 (APPlication marker header 1) area that holds information (hereinafter, referred to as meta information) related to the JPEG compression data 533. For example, an APP1(EXIF) 532 is held in the APP1 area. The APP1(EXIF) 532 is an area that holds meta information based on EXIF. Here, the EXIF (Exchangeable Image File Format) is a standard of meta information for a digital still camera.

The APP1(EXIF) 532 includes EXIF specific information 540 and GPS information 550. Positional information supplied from the positional information conversion unit 330 is held in an area of the GPS information 550. Note that the GPS information 550 corresponds to the positional information 511 shown in FIG. 4. Next, the structure of the GPS information 550 will be described in detail with reference to the drawings.

FIG. 6 is a view that shows the structure of the GPS information 550 in the static image file 500 of the first example embodiment of the imaging apparatus 100 according to the embodiment of the invention. Here, it is assumed that a position indicated by the positional information acquired by the positional information acquisition unit 171 is located at "139 degrees, 44 minutes, 25 seconds east longitude and 35 degrees, 37 minutes, 42 seconds north latitude".

The GPS information 550 includes a GPS tag version (GPSVersionID) 551, a north/south latitude (GPSLatitudeRef) 552 and a latitude (GPSLatitude) 553. Furthermore, the GPS information 550 includes an east/west longitude (GPSLongitudeRef) 554, a longitude (GPSLongitude) 555, and the like.

The GPS tag version 551, for example, holds information that indicates version 2.0 as a GPS tag version. The north/south latitude 552 holds "N" that indicates north latitude. The longitude 553 holds "0x23, 0x2C, 0x2A" that indicates 35 degrees, 37 minutes, 42 seconds. Note that "0x" means that alphanumeric characters subsequent to "0x" are hexadecimal (this also applies to the following description).

The east/west longitude 554 holds "E" that indicates east longitude. The longitude 555 holds "0x8B, 0x2C, 0x19" that indicates 139 degrees, 44 minutes, 25 seconds.

Figure 7A:
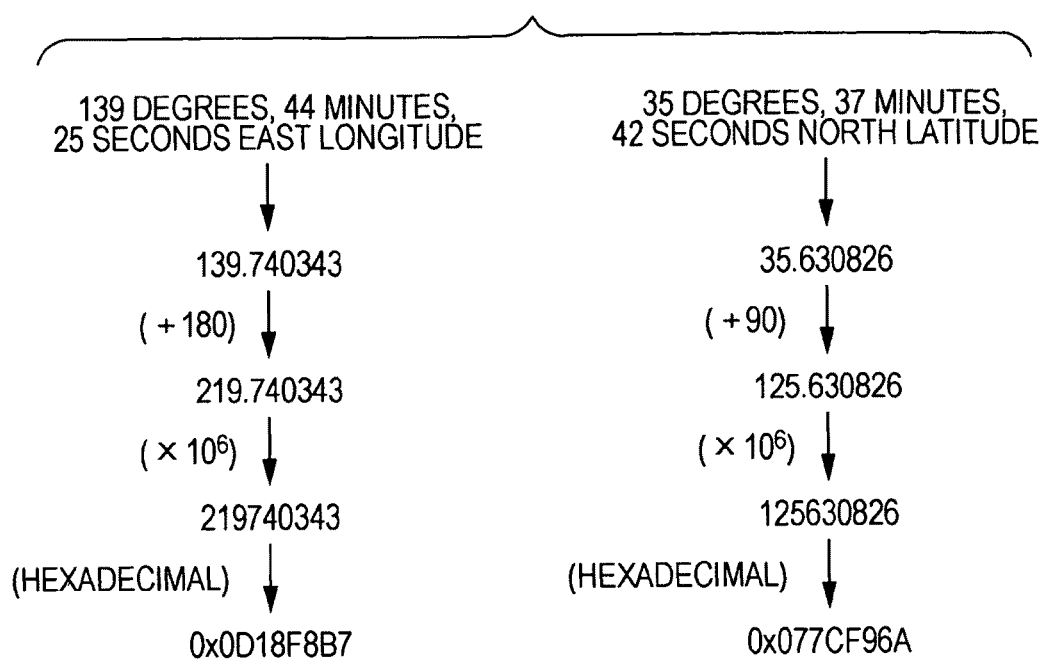
FIG. 7A and FIG. 7B are views that show examples of a data format of positional information held in an area of positional information 511 according to the embodiment of the invention.
Figure 7B:
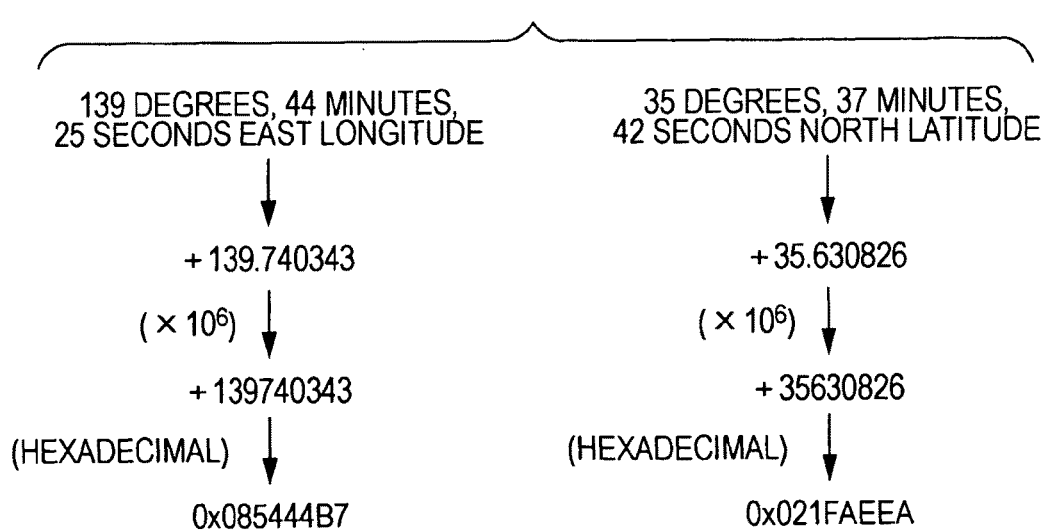

FIG. 7A and FIG. 7B are views that show examples of a data format of positional information held in an area of positional information 511 according to the embodiment of the invention. Here, an example other than the data format for holding the positional information shown in FIG. 6 will be described. FIG. 7A and FIG. 7B show examples in which the data format of positional information acquired by the positional information acquisition unit 171 is converted into a data format to be held in the recording medium 220. Here, it is assumed that the positional information acquired by the positional information acquisition unit 171 is "139 degrees, 44 minutes, 25 seconds east longitude and 35 degrees, 37 minutes, 42 seconds north latitude".

FIG. 7A is an example when longitude and latitude are respectively expressed by 360 degrees and 180 degrees. In FIG. 7A, first, "139 degrees, 44 minutes, 25 seconds east longitude" and "35 degrees, 37 minutes, 42 seconds north latitude" expressed by the degree, minute and second are expressed by the degree. By so doing, the data formats of longitude and latitude are respectively "139.740343" and "35.630826".

Next, in longitude, 180 degrees west longitude to 180 degrees east longitude are expressed by "0" to "360", and in latitude, 90 degrees south latitude to 90 degrees north latitude are expressed by "0" to "180". By so doing, the data format of longitude is "219.740343" to which 180 is added, and the data format of latitude is "125.630826" to which 90 is added.

Subsequently, both the latitude and the longitude are multiplied by 10 to the sixth power and then converted into hexadecimal. Thus, the data formats of the longitude and latitude are respectively "0x0D18F8B7" and "0x077CF96A". Then, these two pieces of data are held in the area of the positional information 511. Note that, in this case, the longitude is expressed within the range of "0x00000000" to "0x15752A00", and the latitude is expressed within the range of "0x00000000" to "0x0ABA9500".

FIG. 7B is an example when east longitude and north latitude are expressed by positive values and west longitude and south latitude are expressed by negative values. In FIG. 7B, as in the case of the above, "139 degrees, 44 minutes, 25 seconds east longitude" and "35 degrees, 37 minutes, 42 seconds north latitude" are respectively expressed by the data formats of "139.740343" and "35.630826".

After that, in the longitude, 180 degrees west longitude to 180 degrees east longitude are expressed by "−180" to "+180", and in the latitude, 90 degrees south latitude to 90 degrees north latitude are expressed by "−90" to "+90". By so doing, the data formats of the longitude and latitude are "+139.740343" and "+35.630826".

Thereafter, both the latitude and the longitude are multiplied by 10 to the sixth power and then converted into hexadecimal. Thus, the data formats of the longitude and latitude are respectively "0x085444B7" and "0x021FAEEA". Then, these two pieces of data are held in the area of the positional information 511.

Note that in this case, the longitude is expressed within the range of "0x00000000" to "0x0ABA9500" or the range of "0xF5456B00" to "0xFFFFFFFF". The latitude is expressed by the range of "0x00000000" to "0x055D4A80" to the range of "0xFAA2B580" to "0xFFFFFFFF".

Figure 8:
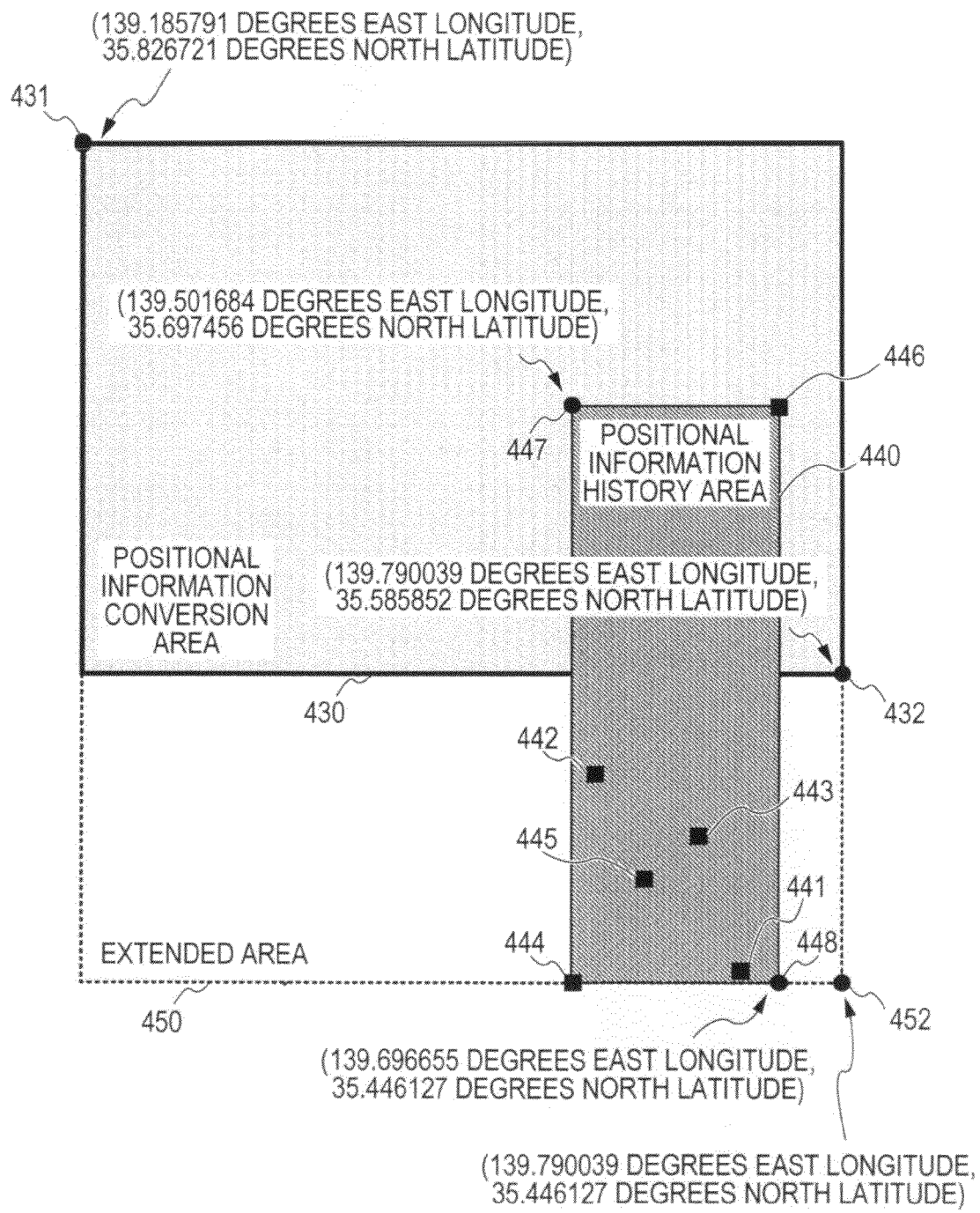
FIG. 8 is a view that shows an extended area 450 defined by a positional information conversion unit 330 according to the embodiment of the invention.

FIG. 8 is a view that shows an extended area 450 defined by a positional information conversion unit 330 according to the embodiment of the invention. Here, a rectangular positional information conversion area 430 is shown. In the positional information conversion area 430, an upper left position 431 indicates "139.185791 degrees east longitude and 35.826721 degrees north latitude", and a lower left position 432 indicates "139.790039 degrees east longitude and 35.585952 degrees north latitude".

In addition, here, six positional information histories 441 to 446 are held by the positional information history holding unit 350. The positional information histories 441 to 443 respectively indicate "139.636230 degrees east longitude and 35.447246 degrees north latitude", "139.512634 degrees east longitude and 35.523285 degrees north latitude" and "139.603271 degrees east longitude and 35.519932 degrees north latitude". In addition, the positional information histories 444 to 446 respectively indicate "139.501648 degrees east longitude and 35.446127 degrees north latitude", "139.546280 degrees east longitude and 35.495338 degrees north latitude" and "139.696655 degrees east longitude and 35.697456 degrees north latitude".

In this case, the positional information conversion unit 330 extracts the maximum value and the minimum value in each of the longitudes and latitudes from among the positional information histories 441 to 446 to define a positional information history area 440. In this example, in the positional information history area 440, an upper left position 447 is the minimum value of the longitudes and the maximum value of the latitudes, and is "139.501684 degrees east longitude and 35.697456 degrees north latitude". A lower right position 448 is the maximum value of the longitudes and the minimum value of the latitudes, and is "139.696655 degrees east longitude and 35.446127 degrees north latitude".

In this way, the positional information history area 440 is defined on the basis of the history of pieces of positional information held by the positional information history holding unit 350.

Next, the extended area 450 that includes the positional information conversion area 430 and the positional information history area 440 is defined on the basis of the positions 431 and 432 and the positions 447 and 448. As in the case of definition of the positional information history area 440, the maximum value and minimum value in each of the longitudes and the latitudes are respectively extracted from among these pieces of positional information to obtain the positions 431 and 452 and then define the extended area 450.

Here, a method of generating positional information that indicates the inside of the extended area 450 using the two random numbers corresponding to latitude and longitude will be simply described. Each of the two random numbers falls within the range from "0.000000" to "1.000000". Here, it is assumed that the value of random number corresponding to the longitude is "0.34264", and the value of random number corresponding to the latitude is "0.843264".

In this case, the longitude in the converted positional information is calculated from the following mathematical expression.

$$(139.790039-139.185791) \times 0.353264+139.185791=139.399250$$

In addition, the latitude in the converted positional information is calculated from the following mathematical expression.

$$(35.826721-35.446127) \times 0.843264+35.446127=35.767068$$

In this way, the position "139.399250 degrees east longitude and 35.767068 degrees north latitude" indicated by the positional information that is converted using the positions 431 and 452 and two random numbers becomes positional information that indicates the inside of the extended area 450. By so doing, even when compared with positional information of an image file outside the positional information conversion area, it is possible to make it hard for a third person to infer conversion of positional information from analogy.

Figure 9:
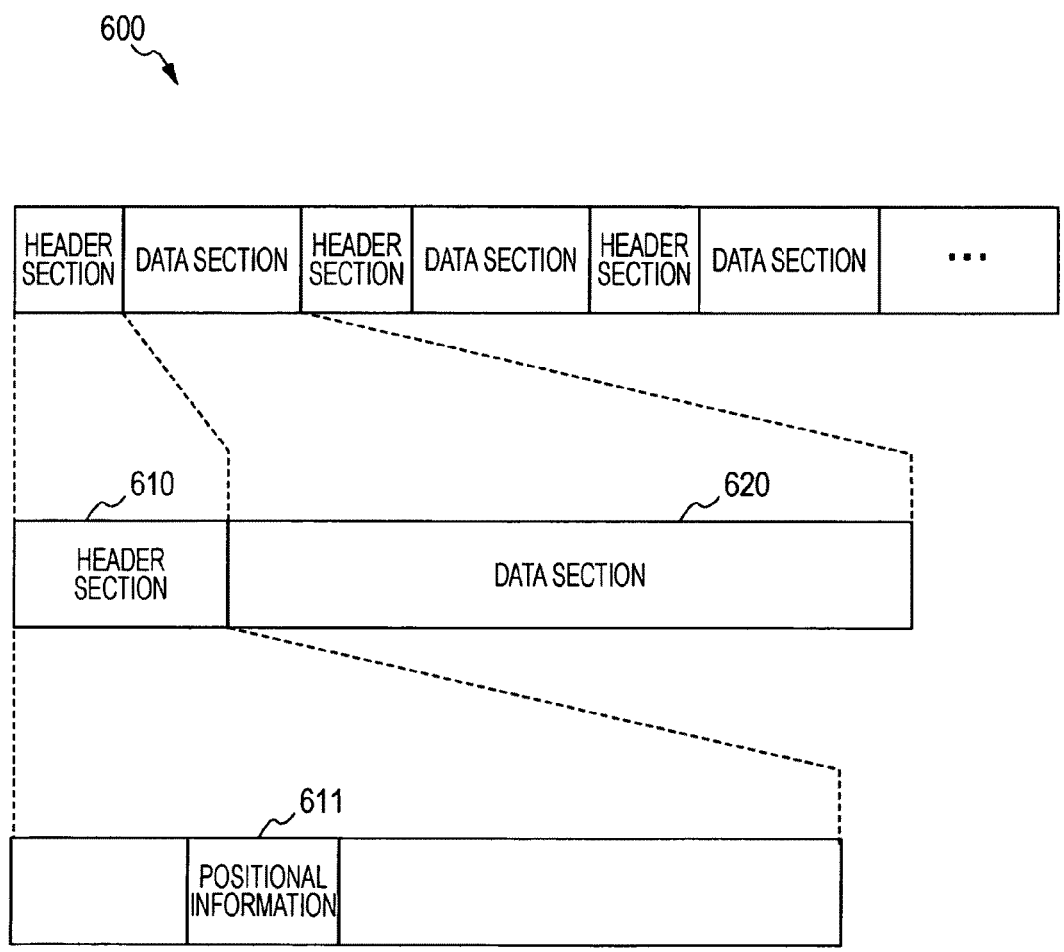
FIG. 9 is a schematic view that shows the data structure of a moving image file generated by the imaging apparatus 100 according to the embodiment of the invention.

FIG. 9 is a schematic view that shows the data structure of a moving image file generated by the imaging apparatus 100 according to the embodiment of the invention. A moving image file 600 is formed of a header section 610 and a data section 620. The data section 620 holds moving image data, which are captured image data generated by the captured image data generation unit 110, in a predetermined format. The header section 610 holds information related to the moving image data, and includes an area of positional information 611 that holds positional information at the time when an image is captured. The positional information 611 holds positional information supplied from the positional information conversion unit 330. Note that the moving image file 600 may include the header section 610 for each GOP (Group Of Picture) or may include the header section 610 for each constant interval in a stream. Next, the data structure of a disk compliant with the DVD-Video standard will be described as an example of the file structure of the moving image file with reference to the drawings.

Figure 10:
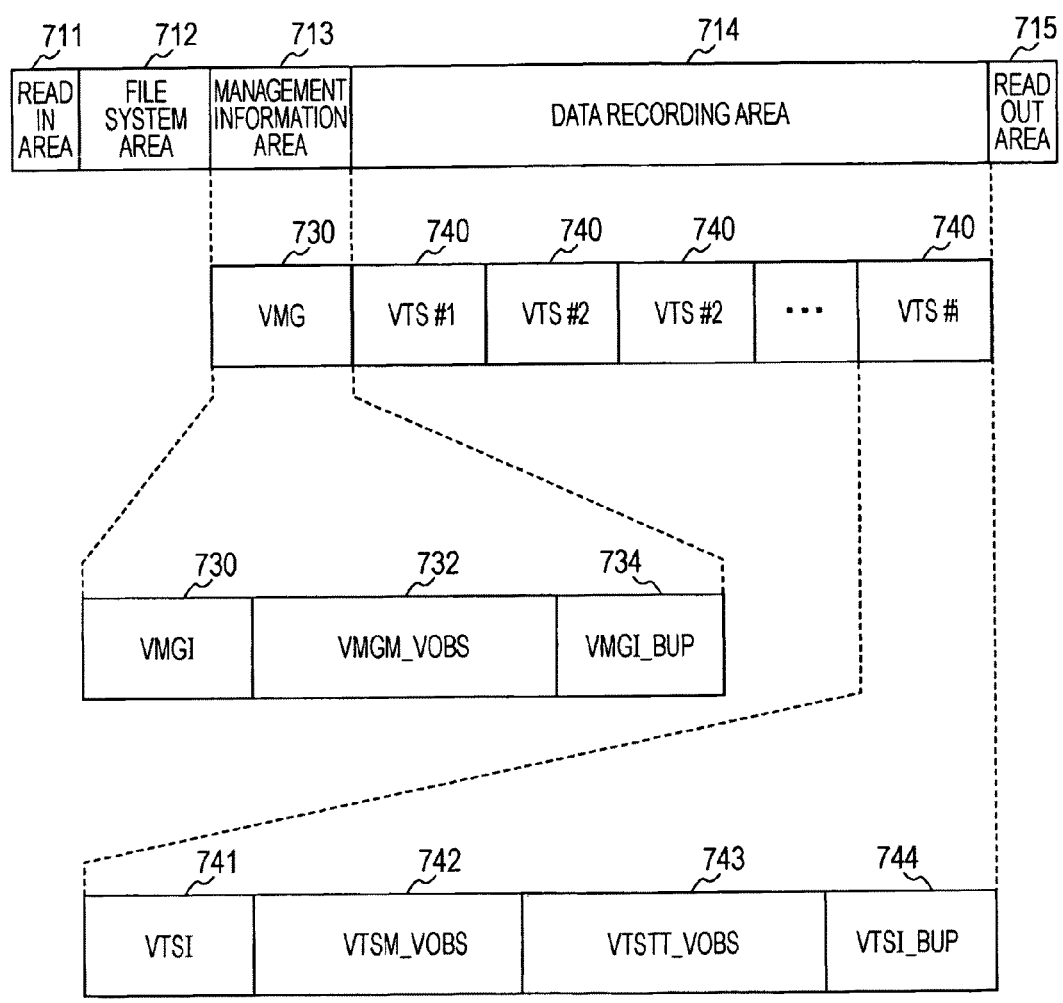
FIG. 10 is a view that shows the data structure of a disk compliant with DVD-Video standard.

FIG. 10 is a view that shows the data structure of a disk compliant with DVD-Video standard. The disk has a disc-like shape. The disk has a read-in area 711 at the inner peripheral side and a read-out area 715 at the outer peripheral side. Then, a file system area 712, a management information area 713 and a data recording area 714 are provided in order from the inner peripheral side toward the outer peripheral side. The file system area 712 is a management area for a file system, and is provided in compliant with the standard of ISO9660 and UDF (Universal Disk Format). The management information area 713 is an area that holds management information of whole video content recorded in the disk. The data recording area 714 is an area that holds the content of each video title set and its control information. Note that these areas are partitioned into 2048-byte logical sectors.

The management information area 713 holds a VMG (Video ManaGer) 730. The VMG 730 includes VMGI (VMG Information) 731, a VMGM_VOBS (Video OBject Set for VMG Menu) 732, and a VMGI_BUP (VMGI for Back UP) 734. As will be described later, the VMGI 731 holds management information of each title of video content recorded in the disk, control information of a top menu, and the like. The VMGM_VOBS 732 holds data of the top menu. In addition, the VMGI_BUP 734 is a backup copy of the VMGI 731.

The data recording area 714 holds at least one VTS (Video Titles Set) 740. Each VTS 740 includes VTSI (VTS Information) 741 and a VTSM_VOBS (Video OBject Set for VTS Menu) 742. Furthermore, each VTS 740 includes a VTSTT_VOBS (Video Object Set for Titles in a VTS) 743 and a VTSI_BUP (VTSI for Back UP) 744. As will be described later, the VTSI 741 holds the management information and control information of each chapter of titles included in the video title set, control information of a chapter menu, and the like. The VTSM_VOBS 742 holds data of the chapter menu. The VTSTT_VOBS 743 holds data of titles included in the video title set. In addition, the VTSI_BUP 744 is a backup copy of the VTSI 741.

Figure 11:
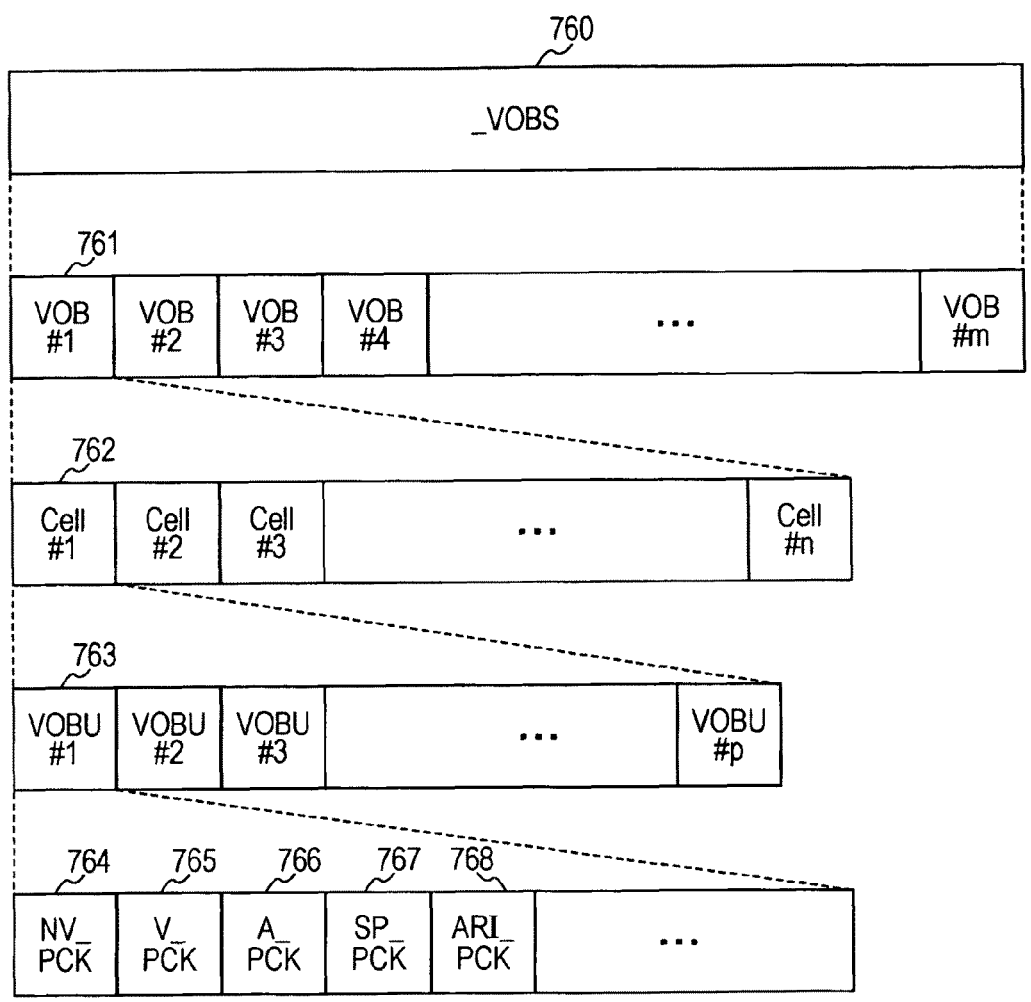
FIG. 11 is a view that shows components of a video object set (VOBS)

FIG. 11 is a view that shows components of a video object set (VOBS). The VMGM_VOBS 732, the VTSM_VOBS 742 and the VTSTT_VOBS 743 shown in FIG. 10 hold the respective pieces of data as video object sets (VOBS), and have a common format. The VOBS 760 is a set of one or more video objects (VOB) 761. A VOB_ID number is assigned to the VOB 761 and is used for identification. The VOB 761 is formed of one or more cells 762. Each cell 762 is a real-time presentation unit, and a cell ID number is assigned to each cell 762 as in the case of the VOB 761.

Each cell 762 includes one or more video object units (VOBU) 763. Each VOBU 763 is a sequence of packs in which the first pack is a navigation pack (NV_PCK) 764. Each pack is 2048-byte fixed data. The packs include an additional recording information pack (ARI_PCK) 768 that holds additional recording information. The positional information supplied from the positional information conversion unit 330 is held in an area of the additional recording information pack. In addition, other than the first NV_PCK 764, a video pack (V_PCK) 765 that holds video data and an audio pack (A_PCK) 766 that holds audio data are provided where appropriate. Furthermore, a sub-picture pack (SP_PCK) 767 that holds sub-picture data, or the like, is also provided where appropriate.

The NV_PCK 764, subsequent to a pack header 771, holds presentation control information (PCI) 772 and data search information (DSI) 773. The PCI 772 is control information related to presentation display, and holds angle information for non-seamless presentation, information for highlight display of a sub-picture, or the like. The DSI 773 is control information for accessing the disk, and holds angle information for seamless presentation, VOBU search information by the unit of a presentation time (0.5 second×n), or the like.

FIG. 12 is a view that shows the data structure of additional recording information (ARI_PCK) according to the embodiment of the invention. Information included in the ARI_PCK 768 is broadly divided into five types, that is, an additional recording information identifier, application information, recording time information, camera information and positional information.

The additional recording identifier is an identifier that identifies data in a packet as additional recording information, and an additional recording information data identifier (ARI_DAT_ID) and a version number (ARI_DAT_VER) thereof are recorded in the additional recording identifier.

The application information includes a vender name (VND_NAME), which is a vender of a product, a product name (PRD_NAME), which is a product name, an application identifier (APL_ID), manufacturer information data (MNFI_DATA) and a device type (PRD_TYP). Here, the application identifier is information for identifying a recording mode at the time of recording. The manufacturer information data are an area that a developer may freely use, and, for example, debug data at the time of developing are recorded in the developer information data. In addition, the device type is information for identifying a type of a device at the time of recording, and indicates that, for example, it is recorded by a portable camcorder or recorded by a stationary deck (recorder) other than that. The device type may be determined on the basis of a vender name and a product name. However, in that case, a database for acquiring a device type using a vender name and a product name as a key may be necessary. The database is desirably updated through a network where necessary.

A time zone (VOBU_LCL_TM_ZONE) at the time of recording additional recording information data (ARI_DATA) in regard to VOBU in which the additional recording information is included and a recording time (VOBU_REC_TM) of ARI_DATA are recorded in the recording time information. The VOBU_REC_TM is, for example, described by year, month, day, hour, minute, second as a time at which a frame of an I-picture is captured. A time zone corresponding to the VOBU_REC_TM is recorded in the VOBU_LCL_TM_ZONE. Here, the time zone is an offset time from an UTC (Coordinated Universal Time) set in a device by a user. That is, the time zone is a time lag corresponding to a time (local time) of a country in which a recording apparatus is used. A universal time (a public time used when a time is recorded all around the world) may be used as the VOBU_REC_TM, and, in that case, the VOBU_LCL_TM_ZONE is set to zero.

The camera information includes information, such as an F number (F_NUM) and an exposure time (EXP_TM), as information of a setting condition, or the like, at the time of capturing.

The positional information includes north/south latitude (GPS_LAT_REF), latitude (GPS_LAT), east/west longitude (GPS_LON_REF) and longitude (GPS_LON). The positional information supplied from the positional information conversion unit 330 is recorded in the area of the positional information. Note that the positional information in the ARI_PCK 768 corresponds to the positional information 611 shown in FIG. 9.

Next, operations at the time when the imaging apparatus 100 according to the embodiment of the invention captures an image will be described with reference to the drawings.

Figure 13:
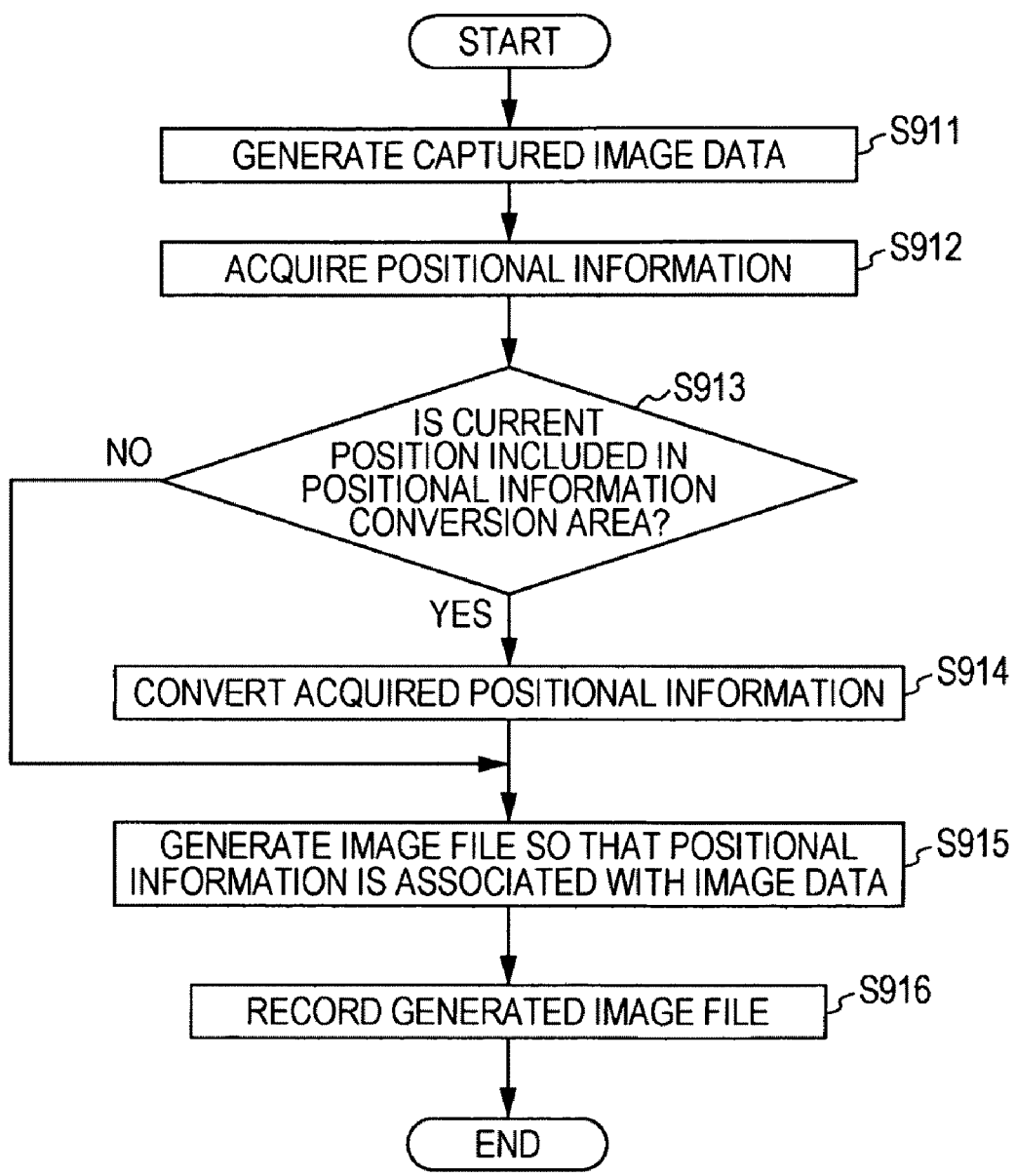
FIG. 13 is a flowchart that shows an example of the procedural steps of a positional information conversion process when the imaging apparatus 100 captures an image according to the embodiment of the invention.

FIG. 13 is a flowchart that shows an example of the procedural steps of a positional information conversion process when the imaging apparatus 100 captures an image according to the embodiment of the invention.

First, the captured image data generation unit 110 generates captured image data (step S911). Note that the step S911 may be regarded as a captured image data generating step according to the embodiment of the invention. Subsequently, the positional information acquisition unit 171 acquires positional information (step S912). Note that the step S912 may be regarded as a positional information acquisition step according to the embodiment of the invention.

Then, the area determination unit 320 determines whether a position indicated by the positional information from the positional information acquisition unit 171 is included in the positional information conversion area held by the positional information conversion area holding unit 310 (step S913). Note that the step S913 may be regarded as an area determination step according to the embodiment of the invention. Then, when it is determined that the position is included in the positional information conversion area, the positional information conversion unit 330 converts the positional information from the positional information acquisition unit 171 into positional information that indicates a position different from the position indicated by the original positional information (step S914). Note that the step S914 may be regarded as a positional information conversion step according to the embodiment of the invention. On the other hand, when it is determined that the position is not included in the positional information conversion area, the positional information from the positional information acquisition unit 171 is supplied to the record control unit 340 without conversion by the positional information conversion unit 330.

After that, the record control unit 340 generates an image file that associates the positional information from the positional information conversion unit 330 with the captured image data generated by the captured image data generation unit 110 (step S915). Then, the record control unit 340 carries out control so as to record the image file in the recording medium 220 (step S916). Note that the steps S915 and S916 may be regarded as a recording control step according to the embodiment of the invention.

In this way, with the first example embodiment of the imaging apparatus 100 according to the embodiment of the invention, when the position indicated by the positional information from the positional information acquisition unit 171 at the time of capturing is included in the positional information conversion area, it is possible to convert the positional information into positional information different from the position indicated by the original positional information. By so doing, even when the image file is opened to the public on the Internet, it is possible to make it hard for a third person to see an actual position of a captured image captured in an area in which a user does not want others to see positional information. In addition, the positional information conversion unit 330 is able to convert positional information so that the converted positional information indicates a positional information conversion area. By so doing, even when compared with positional information of an image file outside the positional information conversion area, the converted positional information does not indicate a position that is unnaturally located away from an original position. Thus, it is possible to make it hard for a third person to infer conversion of positional information from analogy.

In addition, the positional information conversion unit 330 is able to convert positional information so that the converted positional information indicates the inside of a positional information history area. By so doing, even when the converted positional information indicates an area outside the positional information conversion area 430, the positional information is converted on the basis of positional information of captured images acquired in the past. Thus, it is possible to make it hard for a third person to infer conversion of positional information from analogy.

Note that positional information of an image file is converted to make it hard for a third person to see an original position in the first example embodiment according to the embodiment of the invention; however, it may also be assumed that an imaging person himself checks positional information of the image file. In this case, when positional information is converted by adding or subtracting a predetermined value to or from positional information that the positional information acquisition unit 171, it is possible to convert the positional information, converted using the predetermined value, back to the original positional information. However, for example, when random numbers are used to convert positional information, it is difficult to convert the converted positional information back to the original positional information. Thus, a second example embodiment described below is improved so that, when positional information is converted, encrypted original positional information is added to the image file in addition to the converted positional information.

Figure 14:
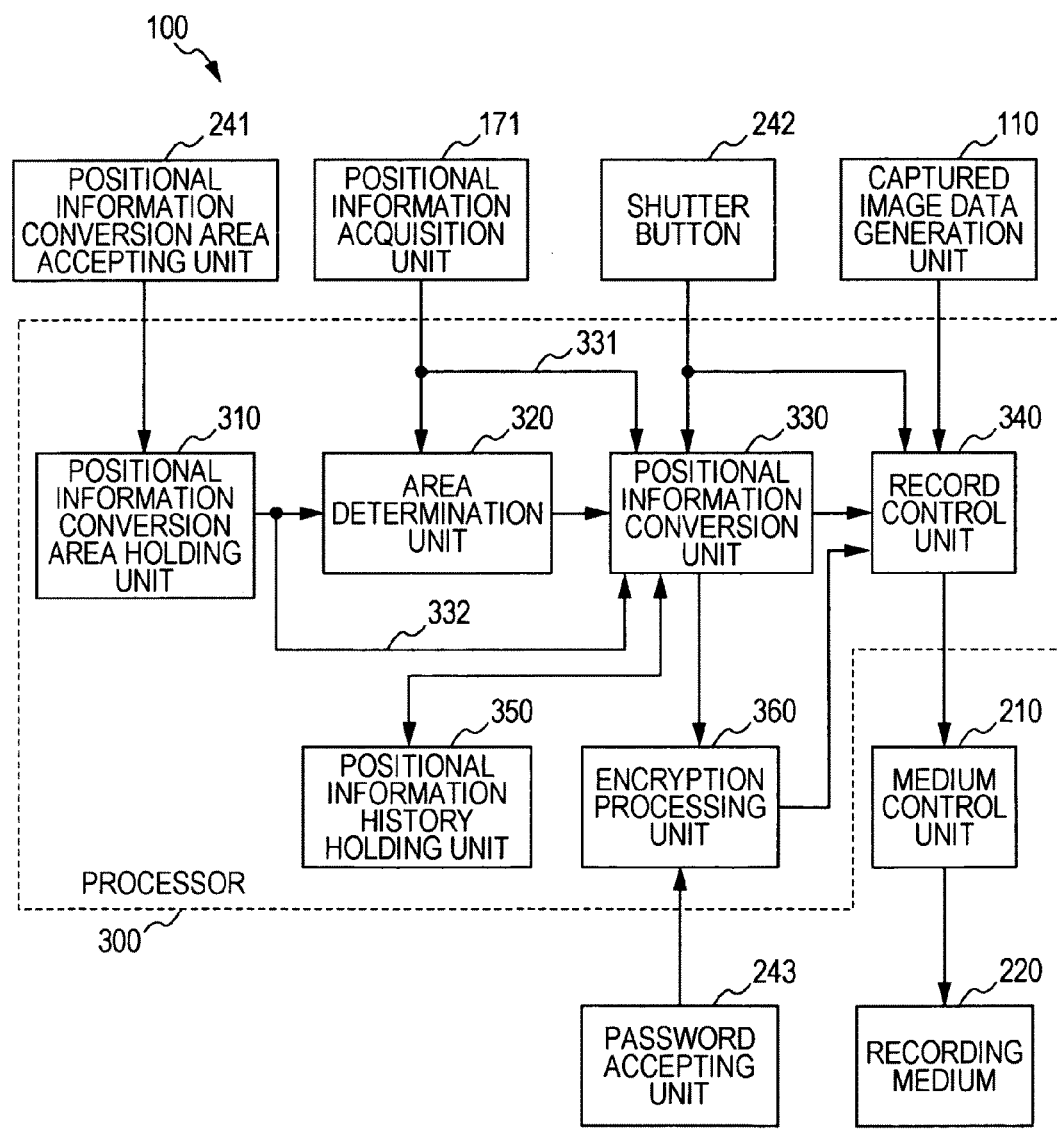
FIG. 14 is a block diagram that shows an example of a functional configuration when a second example embodiment of the imaging apparatus 100 captures an image according to the embodiment of the invention.

FIG. 14 is a block diagram that shows an example of a functional configuration when a second example embodiment of the imaging apparatus 100 captures an image according to the embodiment of the invention. Here, in addition to the configuration shown in FIG. 2, an encryption processing unit 360 and a password accepting unit 243 are shown. Note that the configuration, other than the positional information conversion unit 330, the record control unit 340, the encryption processing unit 360 and the password accepting unit 243, is similar to that of FIG. 2, so the description is omitted here.

The password accepting unit 243 accepts a password from an imaging person. Note that the password accepting unit 243 corresponds to the operation accepting unit 240 shown in FIG. 1. In addition, the password accepting unit 243 may be regarded as a password accepting unit according to the embodiment of the invention.

The positional information conversion unit 330, when converting positional information, supplies positional information acquired by the positional information acquisition unit 171 to the encryption processing unit 360. Note that the other functions of the positional information conversion unit 330 are similar to those shown in FIG. 2, so the description is omitted here.

The encryption processing unit 360 carries out encryption process on positional information supplied from the positional information conversion unit 330. The encryption processing unit 360 supplies encrypted positional information to the record control unit 340. The encryption processing unit 360, for example, generates a correspondence table that associates positional information, which is from the positional information acquisition unit 171 and supplied from the positional information conversion unit 330, with the encrypted positional information, and supplies the encrypted positional information to the record control unit 340. By so doing, it is possible to reduce the amount of information of encrypted positional information, and it is possible to convert the encrypted positional information back to original information only by the imaging apparatus 100.

In addition, the encryption processing unit 360, for example, uses a cryptographic key for encryption process to carry out encryption process on positional information supplied by the positional information conversion unit 330, and supplies the encrypted positional information to the record control unit 340. In this case, it is also applicable that a cryptographic key is generated on the basis of a password accepted by the password accepting unit 243. By so doing, only a specific person who has a password is able to decode the encrypted positional information to the original positional information and then use the original positional information. Note that the encryption processing unit 360 may be regarded as an encryption processing unit according to the embodiment of the invention.

The record control unit 340 generates an image file by associating captured image data supplied from the captured image data generation unit 110 with positional information supplied from the positional information conversion unit 330 and encrypted positional information from the encryption processing unit 360. Note that the other functions of the record control unit 340 are similar to those shown in FIG. 2, so the description is omitted here. In addition, the record control unit 340 may be regarded as a record control unit according to the embodiment of the invention.

Figure 15:
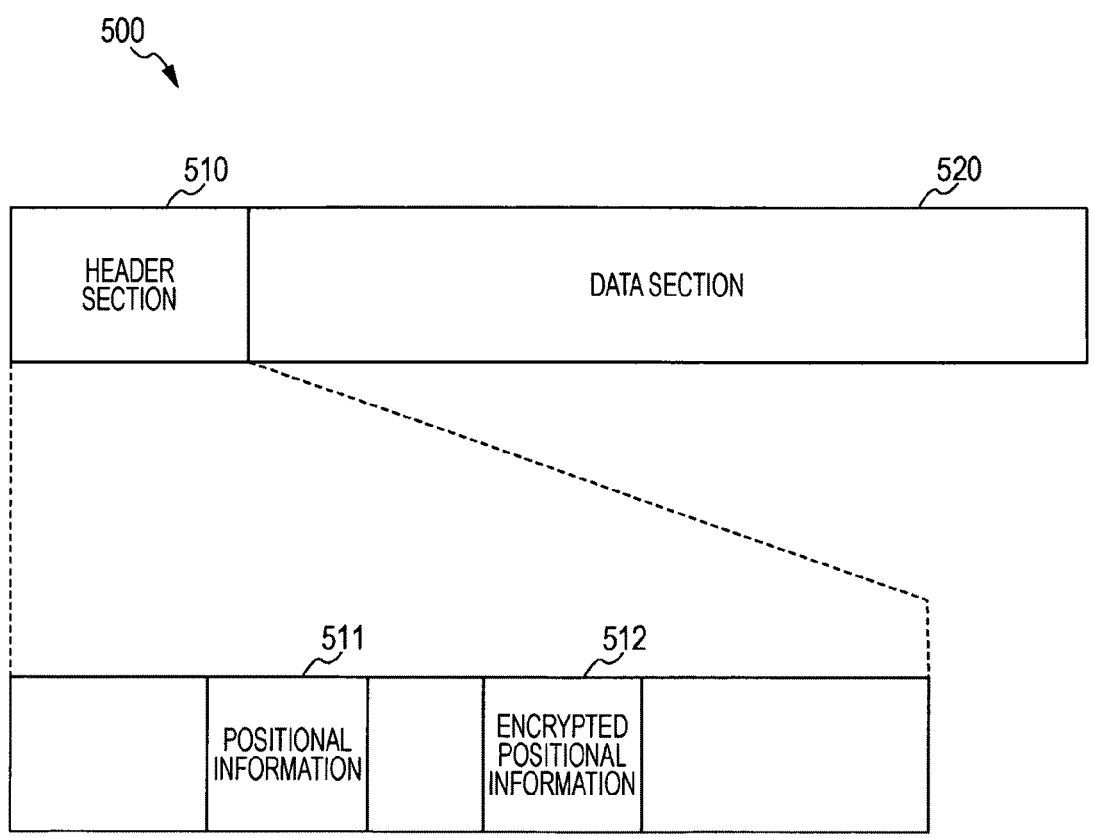
FIG. 15 is a schematic view of the file structure of a static image file 500 according to a second example embodiment of the imaging apparatus 100 according to the embodiment of the invention.

FIG. 15 is a schematic view of the file structure of a static image file 500 according to a second example embodiment of the imaging apparatus 100 according to the embodiment of the invention. Here, in addition to the area of the positional information 511 in the header section 510 shown in FIG. 4, encrypted positional information 512 that holds the encrypted positional information is included. When the converted positional information is held in the positional information 511, the encrypted positional information 512 holds positional information encrypted by the encryption processing unit 360. Note that it is assumed that the area of the encrypted positional information 512 is provided in a reserved area in the header section 510.

Figure 16:
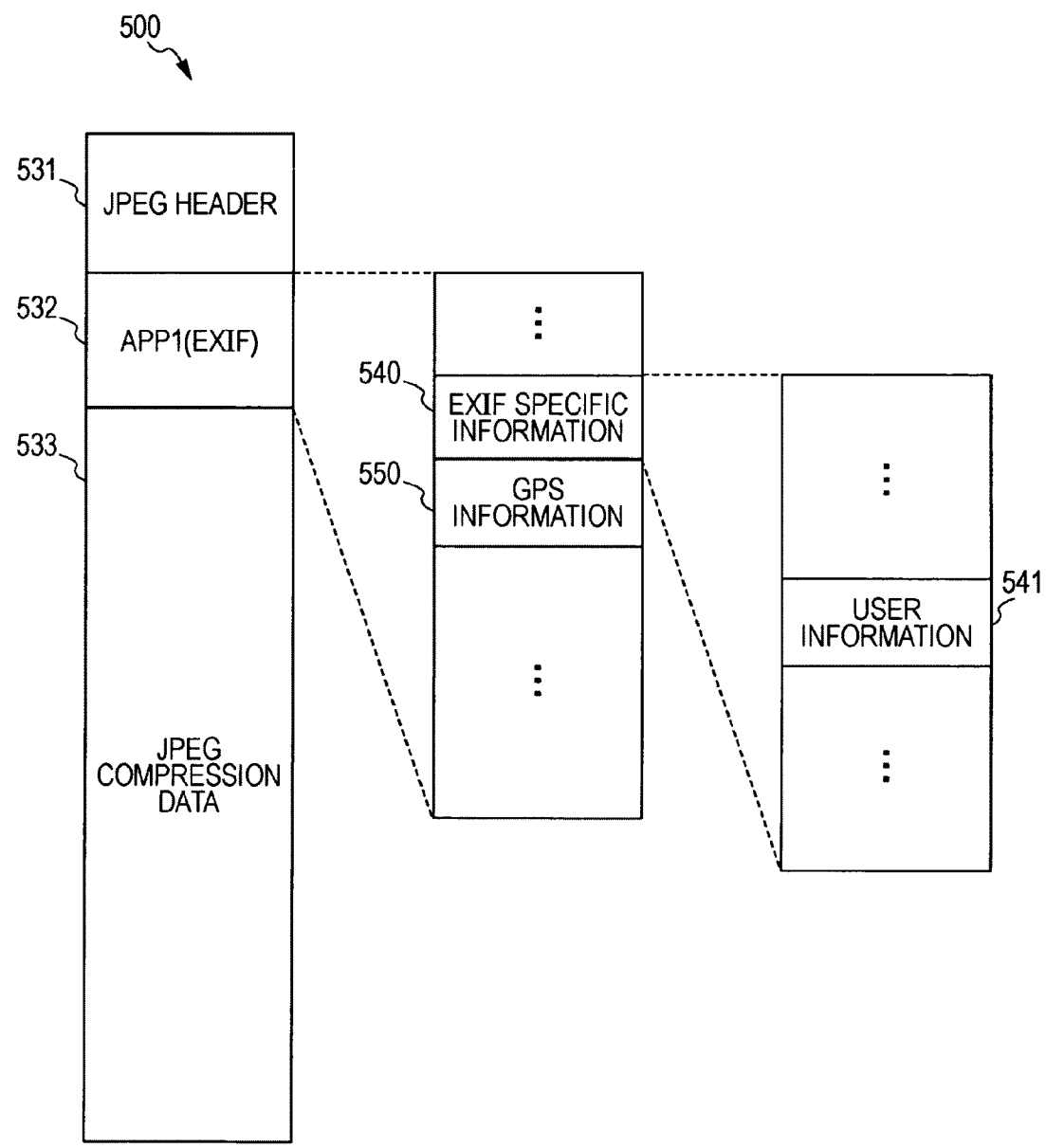
FIG. 16 is a view that shows an example of the file structure of the static image file 500 according to the second example embodiment of the imaging apparatus 100 according to the embodiment of the invention.

FIG. 16 is a view that shows an example of the file structure of the static image file 500 according to the second example embodiment of the imaging apparatus 100 according to the embodiment of the invention. Here, an area of user information 541 included in the EXIF specific information 540 shown in FIG. 5 is shown. The user information 541 includes a maker note area (tag ID=37500) and a user comment area (tag ID=37510). Positional information encrypted by the encryption processing unit 360 may be, for example, held in the maker note area. Note that the maker note area corresponds to the encrypted positional information 512 shown in FIG. 15.

FIG. 17 is a view that shows an example of a correspondence table related to positional information generated by an encryption processing unit 360 in the second example embodiment of the imaging apparatus 100 according to the embodiment of the invention. Here, a correspondence relationship between encrypted positional information 810 and positional information 820 is shown.

The encrypted positional information 810 indicates information supplied to the record control unit 340 as encrypted positional information. The encrypted positional information 810 is held in the area of the encrypted positional information 512 in the static image file 500. The positional information 820 indicates positional information acquired by the positional information acquisition unit 171. For example, positional information corresponding to the encrypted positional information "1" is "139.551430 degrees east longitude and 35.650600 degrees north latitude". That is, positional information in the image file in which the encrypted positional information "1" is held in the area of the encrypted positional information 512 is identified as "139.551430 degrees east longitude and 35.650600 degrees north latitude" from the correspondence table 800.

Figure 18A:
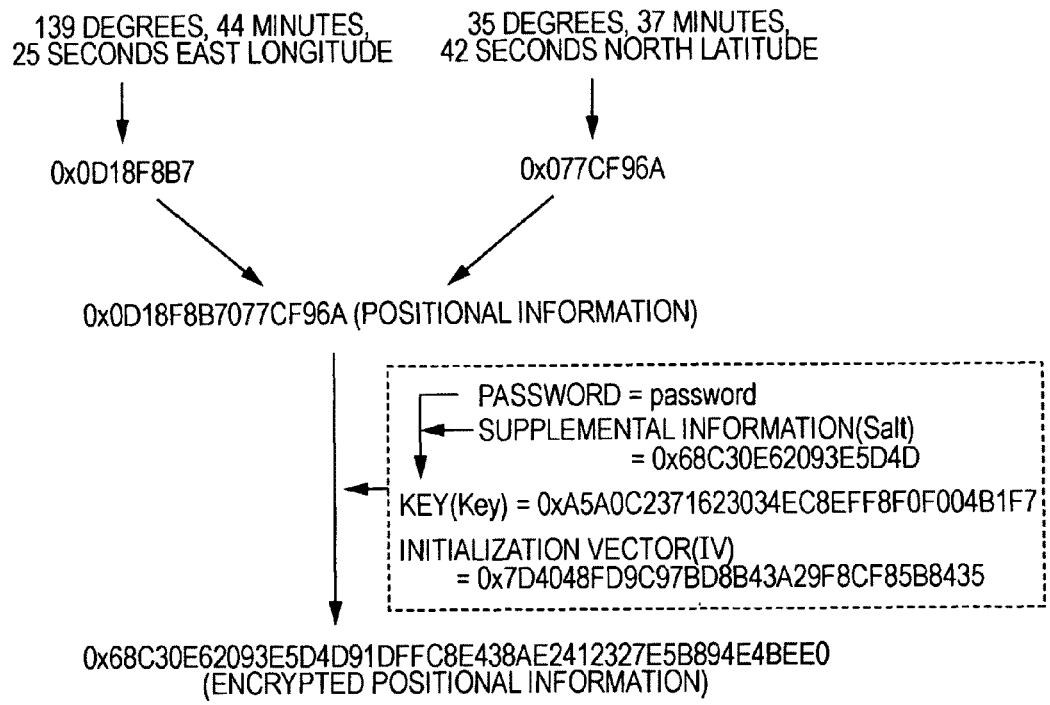
FIG. 18A and FIG. 18B are views that show an example of encryption process using a cryptographic key in the second embodiment of the imaging apparatus 100 according to the embodiment of the invention.
Figure 18B:
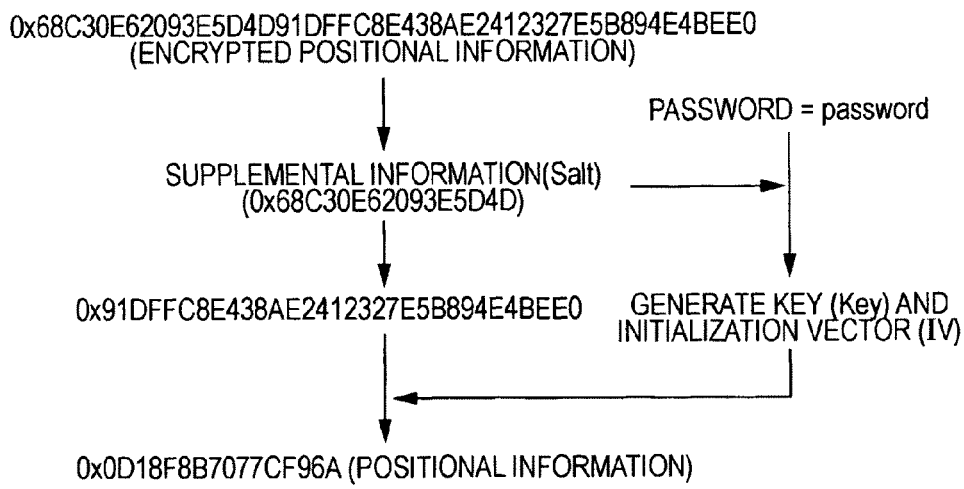

FIG. 18A and FIG. 18B are views that show an example of an encryption process using a cryptographic key in the second embodiment of the imaging apparatus 100 according to the embodiment of the invention. It is assumed that the positional information acquired by the positional information acquisition unit 171 is "139 degrees, 44 minutes, 25 seconds east longitude and 35 degrees, 37 minutes, 42 seconds north latitude". In addition, the positional information is described in the format shown in FIG. 7A. Here, AES (Advanced Encryption Standard) cryptography in a CBC (Cipher Block Chaining) mode is used as a cryptographic technology. In addition, the key length is 128 bits, and a cryptographic key (Key) is generated on the basis of a password.

FIG. 18A is a view that schematically shows a process of encrypting positional information acquired by the positional information acquisition unit 171. Here, the positional information is "0x0D18F8B7077CF96A". This is a combination of the latitude "0x0D18F8B7" and the longitude "0x077CF96A" shown in FIG. 7A.

In this case, a cryptographic key (Key) and an initialization vector (IV) are generated on the basis of a password "password" and supplemental information (Salt) "0x68C30E62093E5D4D". By carrying out AES encryption process on the positional information using the cryptographic key (Key) and initialization vector (IV), encrypted positional information "0x68C30E62093E5D4D91DFFC8E438AE2412327E5B894E4BEE0" is generated.

FIG. 18B is a view that schematically shows a process of decoding the encrypted positional information generated in FIG. 18A. First, supplemental positional information (Salt) is extracted from the encrypted positional information. Here, the cryptographic key (Key) and the initialization vector (IV) are generated on the basis of the supplemental positional information (Salt) and the password "password". The cryptographic key (Key) and the initialization vector (IV) are used to carry out AES decoding on the encrypted positional information "0x91DFFC8E438AE2412327E5B894E4BEE0" after extracting the supplemental information (Salt), and then data of positional information before encryption process is generated.

Figure 19:
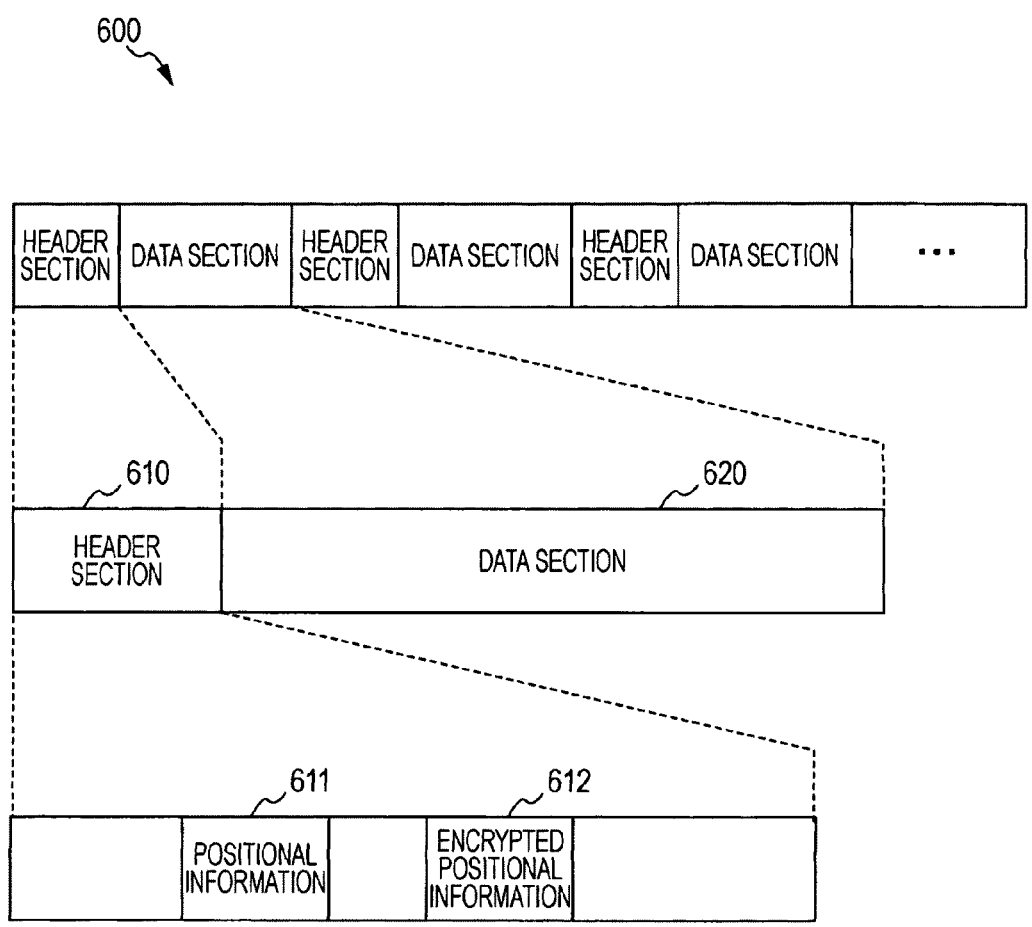
FIG. 19 is a schematic view that shows the file structure of a moving image file 600 in the second example embodiment of the imaging apparatus 100 according to the embodiment of the invention.

FIG. 19 is a schematic view that shows the file structure of a moving image file 600 in the second example embodiment of the imaging apparatus 100 according to the embodiment of the invention. Here, in addition to the area of the positional information 611 in the header section 610 shown in FIG. 9, an area of encrypted positional information 612 that holds encrypted positional information is included. The encrypted positional information 612 holds the positional information encrypted by the encryption processing unit 360.

Figure 20:
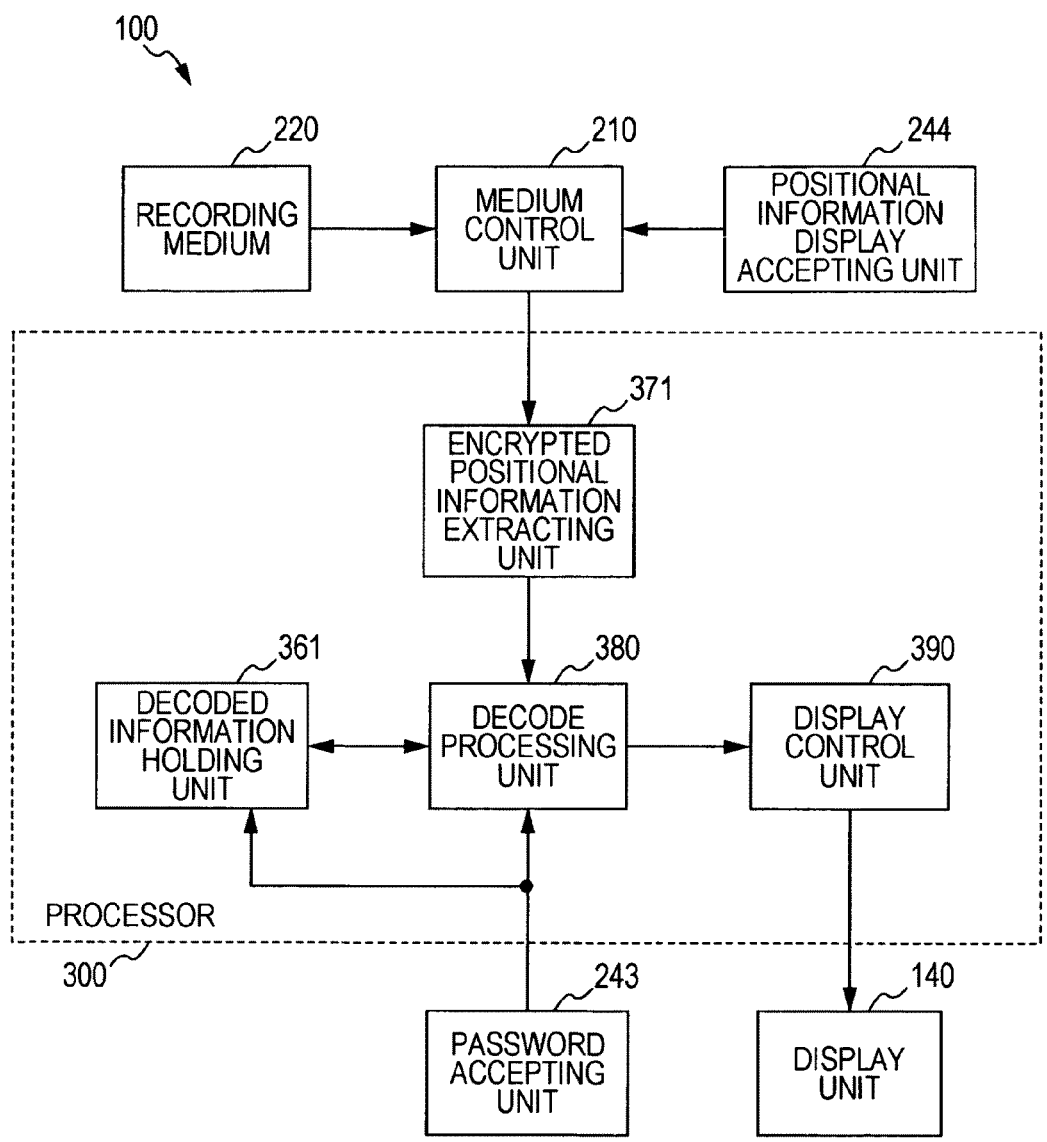
FIG. 20 is a block diagram that shows a functional configuration example when the encrypted positional information is decoded by the second example embodiment of the imaging apparatus 100 according to the embodiment of the invention.

FIG. 20 is a block diagram that shows a functional configuration example when the encrypted positional information is decoded by the second example embodiment of the imaging apparatus 100 according to the embodiment of the invention. Here, it is assumed that encrypted positional information is decoded and then the decoded positional information is displayed on the display unit 140.

The imaging apparatus 100 includes the display unit 140, the medium control unit 210, the recording medium 220, the password accepting unit 243, a positional information display accepting unit 244 and the processor 300. The processor 300 includes a decoded information holding unit 361, an encrypted positional information extracting unit 371, a decode processing unit 380 and a display control unit 390.

The positional information display accepting unit 244 accepts specification of an image file of which positional information is displayed. The positional information display accepting unit 244 supplies the accepted specification of the image file to the medium control unit 210.

The medium control unit 210 reads out the image file, specified by the positional information display accepting unit 244, from the recording medium 220, and supplies the read image file to the encrypted positional information extracting unit 371.

The decoded information holding unit 361 holds information necessary for decoding process. The decoded information holding unit 361, when encryption process using the correspondence table shown in FIG. 17 is, for example, carried out, holds the correspondence table generated by the encryption processing unit 360.

The encrypted positional information extracting unit 371 extracts encrypted positional information held in the area of the encrypted positional information 512 or 612 from the read image file. The encrypted positional information extracting unit 371 supplies the encrypted positional information to the decode processing unit 380.

The decode processing unit 380 decodes encrypted positional information from the encrypted positional information extracting unit 371. The decode processing unit 380, when encryption process using the correspondence table shown in FIG. 17 is carried out, decodes positional information on the basis of the encrypted positional information, which is positional information encrypted by the encrypted positional information extracting unit 371, and the correspondence table held by the decoded information holding unit 361.

In addition, the decode processing unit 380, when encryption process using the password shown in FIG. 18 is, for example, carried out, decodes positional information on the basis of the encrypted positional information and the password accepted by the password accepting unit 243. In this case, it is also applicable that the password accepted by the password accepting unit 243 is held by the decoded information holding unit 361 and then the held password is used to carry out decoding process. By so doing, it is possible to reduce a work of input operation of a password by an imaging person.

In addition, the decode processing unit 380 supplies the decoded positional information to the display control unit 390.

The display control unit 390 causes the display unit 140 to display the decoded positional information. The display unit 140 displays positional information decoded by the display control unit 390 on a display screen.

In this way, with the second example embodiment according to the embodiment of the invention, by providing the encryption processing unit 360, encryption process is carried out on the positional information acquired by the positional information acquisition unit 171, and the encrypted positional information is added to the image file. By so doing, only a specific person who is allowed to decode encrypted positional information may use original positional information.

As described above, in the first and second example embodiments according to the embodiment of the invention, positional information acquired by the positional information acquisition unit 171 is converted at the time when an image is captured; instead, positional information may be converted at the time when an image file is transmitted to an external device. Then, an example in which positional information added to an image file is converted at the time when the image file is transmitted to an external device will be described as a third example embodiment of the imaging apparatus 100 with reference to the following drawings.

Figure 21:
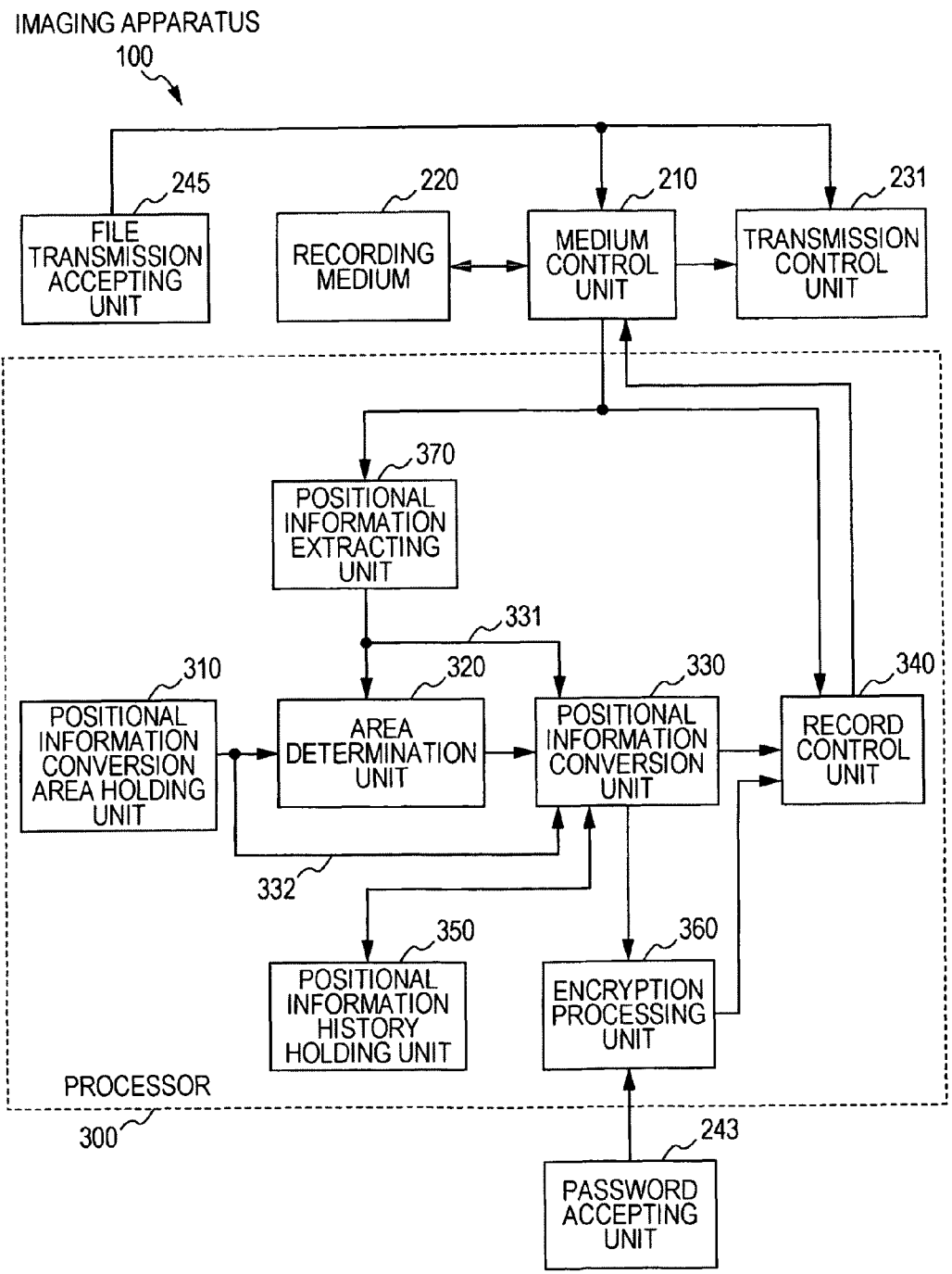
FIG. 21 is a block diagram that shows a functional configuration example of a third example embodiment of the imaging apparatus 100 according to the embodiment of the invention.

FIG. 21 is a block diagram that shows a functional configuration example of a third example embodiment of the imaging apparatus 100 according to the embodiment of the invention. Here, it is assumed that an image file of which positional information is not converted is recorded in the recording medium 220, and the positional information is converted at the time when the image file is transmitted to an external device.

The imaging apparatus 100 includes the medium control unit 210, the recording medium 220, a transmission control unit 231, the password accepting unit 243, a file transmission accepting unit 245 and the processor 300. The processor 300 includes the positional information conversion area holding unit 310, the area determination unit 320, the positional information conversion unit 330, the record control unit 340, the positional information history holding unit 350, the encryption processing unit 360 and a positional information extracting unit 370. Note that the recording medium 220, the password accepting unit 243, the positional information conversion area holding unit 310, the area determination unit 320, the positional information conversion unit 330, the positional information history holding unit 350 and the encryption processing unit 360 are similar to those of FIG. 14, so the description thereof is omitted here.

The file transmission accepting unit 245 accepts an operation from an imaging person in order to transmit an image file recorded in the recording medium 220 to an external device. The file transmission accepting unit 245 accepts specification of an image file transmitted to the external device and an address to which the image file is transmitted to the external device. In addition, the file transmission accepting unit 245 supplies the accepted specification of the image file to the medium control unit 210, and supplies the transmission control unit 231 with the address to which the image file is transmitted to the external device. Note that the file transmission accepting unit 245 corresponds to the operation accepting unit 240 shown in FIG. 1.

The medium control unit 210 reads out an image file recorded in the recording medium 220 on the basis of the specification of the image file accepted by the file transmission accepting unit 245. The medium control unit 210 supplies the read image file to the positional information extracting unit 370 and the record control unit 340.

In addition, the medium control unit 210 causes the recording medium 220 to temporarily store separate pieces of data generated by the record control unit 340. In this case, for example, a flip flop circuit, or the like, may be used as the recording medium 220. Then, the medium control unit 210, when a transmission instruction is issued from the file transmission accepting unit 245, supplies the held separate pieces of data to the transmission control unit 231. Note that, here, it is assumed that an image file is transmitted to an external device; however, it may also be assumed that an image file of which positional information is not converted is replaced with an image file of which positional information is converted. In this case, the medium control unit 210 records an image file newly generated by the record control unit 340 in the recording medium 220. Note that the medium control unit 210 may be regarded as a file read control unit according to the embodiment of the invention.

The positional information extracting unit 370 extracts positional information added to the image file read by the medium control unit 210. The positional information extracting unit 370 supplies the extracted positional information to the area determination unit 320 and the positional information conversion unit 330. Note that the positional information extracting unit 370 may be regarded as a positional information extracting unit according to the embodiment of the invention.

The record control unit 340 generates a new image file on the basis of positional information supplied from the positional information conversion unit 330, positional information encrypted by the encryption processing unit 360 and an image file supplied from the medium control unit 210. The record control unit 340 controls the medium control unit 210 so that the recording medium 220 holds the newly generated image file. Note that the record control unit 340 may be regarded as a record control unit according to the embodiment of the invention.

The transmission control unit 231 carries out control so as to transmit an image file generated by the record control unit 340 on the basis of an address accepted by the file transmission accepting unit 245. Note that the transmission control unit 231 corresponds to the communication unit 230 shown in FIG. 1. In addition, the transmission control unit 231 may be regarded as a transmission control unit according to the embodiment of the invention.

Next, operations when the imaging apparatus 100 according to the embodiment of the invention transmits an image file will be described with reference to the drawing.

Figure 22:
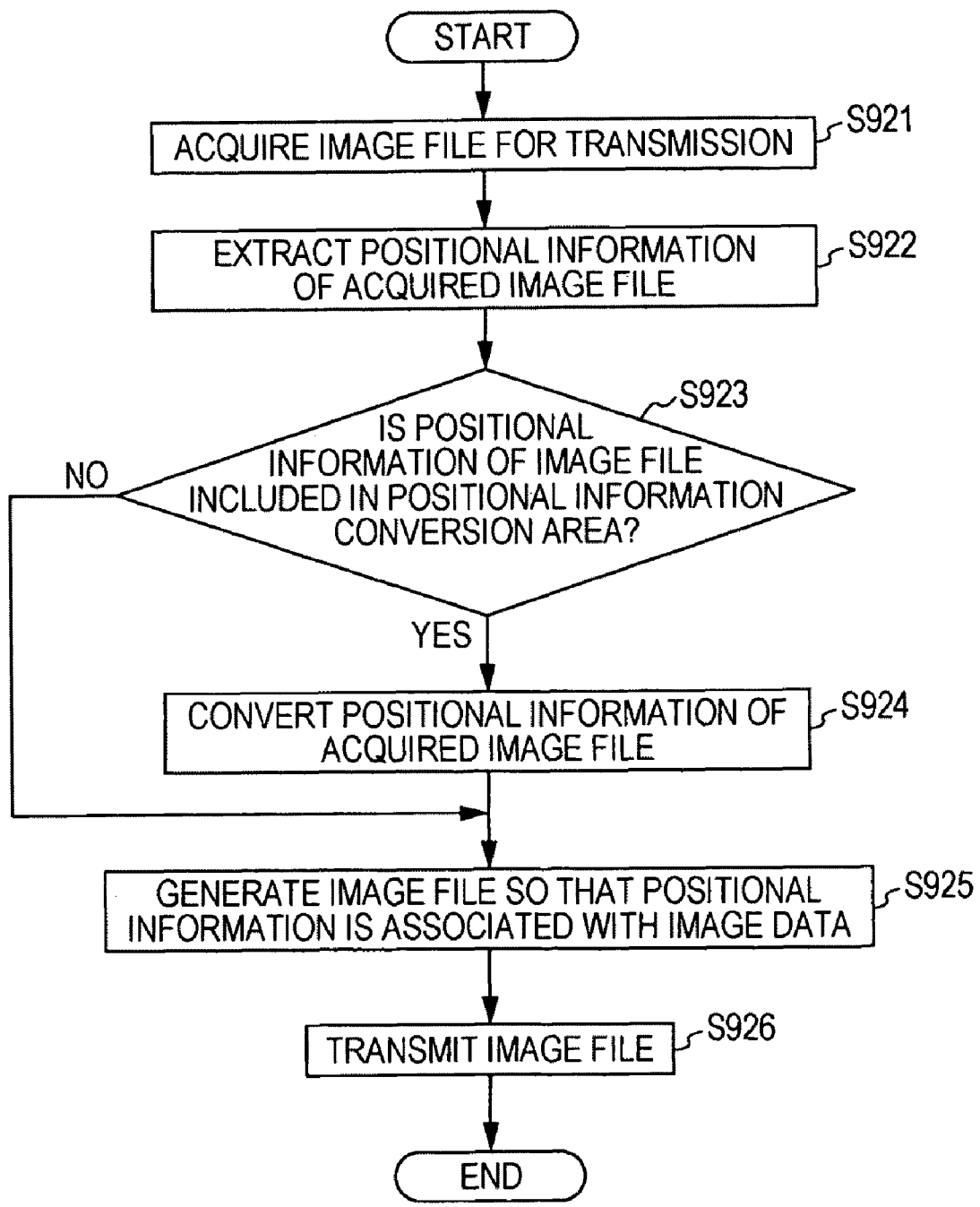
FIG. 22 is a flowchart that shows an example of procedural steps of a positional information conversion process in the third example embodiment of the imaging apparatus 100 according to the embodiment of the invention.

FIG. 22 is a flowchart that shows an example of procedural steps of a positional information conversion process in the third example embodiment of the imaging apparatus 100 according to the embodiment of the invention.

First, the medium control unit 210 reads out an image file recorded in the recording medium 220 (step S921). Note that the step S921 may be regarded a file read control step according to the embodiment of the invention. Subsequently, the positional information extracting unit 370 extracts positional information added to the read image file (step S922). Note that the step S922 may be regarded as a positional information extracting step according to the embodiment of the invention.

Then, the area determination unit 320 determines whether a position indicated by the positional information from the positional information extracting unit 370 is included in a positional information conversion area held in the positional information conversion area holding unit 310 (step S923). Note that the step S923 may be regarded as an area determination step recited according to the embodiment of the invention. Then, when it is determined that the position is included in the positional information conversion area, the positional information conversion unit 330 converts the positional information into positional information that indicates a position different from the position indicated by the original positional information from the positional information extracting unit 370 (step S924). Note that the step S924 may be regarded as a positional information conversion step according to the embodiment of the invention. On the other hand, when it is determined that the position is not included in the positional information conversion area, the positional information from the positional information extracting unit 370 is supplied to the record control unit 340 without conversion by the positional information conversion unit 330.

After that, the record control unit 340 generates a new image file that associates the positional information from the positional information conversion unit 330 with the captured image data in the image file supplied from the medium control unit 210 (step S925). Note that the step S925 may be regarded as a recording control step according to the embodiment of the invention. Then, the transmission control unit 231 carries out control so as to transmit the generated image file to an external device (step S926).

In this way, with the third example embodiment according to the embodiment of the invention, by providing the positional information extracting unit 370, it is possible to convert positional information added to an image file to be transmitted when the image file is transmitted to an external terminal. Note that, here, positional information added to an image file is converted when the image file is transmitted to an external device as an example; however, a timing at which positional information is converted is not limited to this.

In this way, according to the embodiment of the invention, the positional information conversion unit 330, when a position indicated by positional information added to an image file indicates the inside of the positional information conversion area, is able to convert the positional information into positional information that indicates a position different from the position indicated by the original positional information. By so doing, it is possible to prevent others from seeing positional information related to personal information when a captured image is used.

Note that in the embodiment according to the invention, positional information is calculated on the basis of a GPS signal; instead, positional information may be acquired by another positional information acquisition method. For example, information about access points through wireless LAN (Local Area Network) set therearound may be used to derive positional information and then the positional information may be used.

In addition, in the embodiment according to the invention, the imaging apparatus is described as an example; instead, the embodiment of the invention may be applied to an imaging apparatus, such as a device having a camera function, that is, for example, a cellular phone, a PC (Personal Computer), and the like, equipped with an image pickup unit.

Note that the embodiment of the invention describes an example for specifying the invention, and has corresponding relationship with elements according to the embodiment of the invention as described above. However, the embodiment of the invention is not limited to the above embodiment; the embodiment of the invention may be modified into various forms without departing from the scope of the invention.

In addition, the procedural steps described in the embodiment of the invention may be regarded as a method that includes a series of these steps or may be regarded as a program for causing a computer to execute a series of these steps or a recording medium that stores the program. The recording medium may be, for example, a CD (Compact Disc), an MD (MiniDisc), a DVD (Digital Versatile Disk), a memory card, a Blu-ray Disc (trademark), or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    a captured image data generation unit that generates captured image data by capturing a subject;
    a positional information acquisition unit that acquires positional information that indicates a position at which the captured image data are generated;
    an area determination unit that determines whether the position indicated by the acquired positional information is included in a positional information conversion area for converting the acquired positional information;
    a positional information conversion unit that, when the area determination unit determines that the position indicated by the acquired positional information is included in the positional information conversion area, converts the acquired positional information into positional information that indicates a position different from the position indicated by the acquired positional information;
    a record control unit that, when recording the generated captured image data, carries out control so as to record the generated captured image data in association with the positional information converted by the positional information conversion unit; and
    a positional information history holding unit that holds a history of the acquired positional information,
    wherein the position different from the position indicated by the acquired positional information is confined by the positional information conversion unit to within a history area defined by the history of the positional information held by the positional information history holding unit.

2. The imaging apparatus according to claim 1, wherein the positional information conversion unit converts the acquired positional information into the positional information that indicates the different position using a displacement used to move the position indicated by the acquired positional information.

3. The imaging apparatus according to claim 1, wherein the positional information conversion unit generates the positional information that indicates the different position in the positional information conversion area on the basis of a random number.

4. The imaging apparatus according to claim 1, wherein the position different from the position indicated by the acquired positional information is confined by the positional information conversion unit to within an extended area that includes the history area, defined by the history of the positional information held by the positional information history holding unit, and the positional information conversion area.

5. The imaging apparatus according to claim 1, further comprising:
    an encryption processing unit that carries out encryption process on the acquired positional information, wherein when the area determination unit determines that the position indicated by the acquired positional information is included in the positional information conversion area, the record control unit carries out control so that the generated captured image data are recorded so as to be associated with the positional information converted by the positional information conversion unit and the positional information encrypted by the encryption processing unit.

6. The imaging apparatus according to claim 5, wherein the encryption processing unit generates a correspondence table that associates the encrypted positional information with the acquired positional information.

7. The imaging apparatus according to claim 5, further comprising:
    a password accepting unit that accepts a password, wherein the encryption processing unit generates the encrypted positional information using a cryptographic key generated on the basis of the password accepted by the password accepting unit.

8. The imaging apparatus according to claim 1, wherein the positional information conversion unit extracts a maximum value and minimum value of latitudes and a maximum value and minimum value of longitudes from the history held by the positional information history holding unit and defines the history area based on the extracted maximum and minimum values.

9. An information recording apparatus comprising:
a file read control unit that carries out control so as to read out a captured image file, which associates captured image data generated by capturing a subject with positional information that indicates a position at which the captured image data are generated, from a recording medium;
a positional information extracting unit that extracts positional information in the captured image file read by the file read control unit;
an area determination unit that determines whether a position indicated by the extracted positional information is included in a positional information conversion area for converting the extracted positional information;
a positional information conversion unit that, when the area determination unit determines that the position indicated by the extracted positional information is included in the positional information conversion area, converts the extracted positional information into positional information that indicates a position different from the position indicated by the extracted positional information;
a record control unit that carries out control so as to record the read captured image file so that the captured image data in the read captured image file are associated with the positional information converted by the positional information conversion unit; and
a positional information history holding unit that holds a history of the extracted positional information,
wherein the position different from the position indicated by the extracted positional information is confined by the positional information conversion unit to within a history area defined by the history of the positional information held by the positional information history holding unit.

10. The information recording apparatus according to claim 9, further comprising:
a transmission control unit that carries out control so as to transmit the captured image data, associated by the record control unit with the positional information converted by the positional information conversion unit, and the converted positional information.

11. The information recording apparatus according to claim 9, wherein the positional information conversion unit extracts a maximum value and minimum value of latitudes and a maximum value and minimum value of longitudes from the history held by the positional information history holding unit and defines the history area based on the extracted maximum and minimum values.

12. A positional information conversion method, comprising:
generating captured image data by capturing a subject; and
using a processor to carry out the following:
acquiring positional information that indicates a position at which the captured image data are generated,
determining whether the position indicated by the acquired positional information is included in a positional information conversion area for converting the acquired positional information,
when the position indicated by the acquired positional information is determined to be included in the positional information conversion area, converting the acquired positional information into positional information that indicates a position different from the position indicated by the acquired positional information,
holding a history of the acquired positional information,
wherein the position different from the position indicated by the acquired positional information is confined to within a history area defined by the history of the acquired positional information, and
when recording the generated captured image data, carrying out control so as to record the generated captured image data in association with the converted positional information.

13. A position information conversion method, comprising:
using a processor to carry out the following:
carrying out control so as to read out a captured image file, which associates captured image data generated by capturing a subject with positional information that indicates a position at which the captured image data are generated, from a recording medium,
extracting positional information in the read captured image file,
determining whether a position indicated by the extracted positional information is included in a positional information conversion area for converting the extracted positional information,
when the position indicated by the extracted positional information is determined to be included in the positional information conversion area, converting the extracted positional information into positional information that indicates a position different from the position indicated by the extracted positional information,
holding a history of the extracted positional information,
wherein the position different from the position indicated by the extracted positional information is confined to within a history area defined by the history of the extracted positional information, and
carrying out control so as to record the read captured image file so that the captured image data in the read captured image file are associated with the converted positional information.

14. A processor encoded with a computer program for carrying out a positional information conversion method, the method comprising:
generating captured image data by capturing a subject;
acquiring positional information that indicates a position at which the captured image data are generated;
determining whether the position indicated by the acquired positional information is included in a positional information conversion area for converting the acquired positional information;
when the position indicated by the acquired positional information is determined to be included in the positional information conversion area, converting the acquired positional information into positional information that indicates a position different from the position indicated by the acquired positional information;
holding a history of the acquired positional information, wherein the position different from the position indicated by the acquired positional information is confined to within a history area defined by the history of the positional information, and when recording the generated captured image data, carrying out control so as to record the generated captured image data in association with the converted positional information.

15. A processor encoded with a computer program for carrying out a positional information conversion method, the method comprising:

carrying out control so as to read out a captured image file, which associates captured image data generated by capturing a subject with positional information that indicates a position at which the captured image data are generated, from a recording medium;

extracting positional information in the read captured image file;

determining whether a position indicated by the extracted positional information is included in a positional information conversion area for converting the extracted positional information;

when the position indicated by the extracted positional information is determined to be included in the positional information conversion area, converting the extracted positional information into positional information that indicates a position different from the position indicated by the extracted positional information;

holding a history of the extracted positional information, wherein the position different from the position indicated by the extracted positional information is confined to within a history area defined by the history of the extracted positional information, and carrying out control so as to record the read captured image file so that the captured image data in the read captured image file are associated with the converted positional information.

* * * * *